(12) United States Patent
Yoshida

(10) Patent No.: US 8,488,961 B2
(45) Date of Patent: Jul. 16, 2013

(54) DISPERSION DETERMINING APPARATUS AND AUTOMATIC DISPERSION COMPENSATING SYSTEM USING THE SAME

(75) Inventor: Nobuhide Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 1018 days.

(21) Appl. No.: 12/514,766

(22) PCT Filed: Aug. 15, 2007

(86) PCT No.: PCT/JP2007/065900
§ 371 (c)(1),
(2), (4) Date: May 13, 2009

(87) PCT Pub. No.: WO2008/065784
PCT Pub. Date: Jun. 5, 2008

(65) Prior Publication Data
US 2009/0317079 A1    Dec. 24, 2009

(30) Foreign Application Priority Data

Nov. 30, 2006 (JP) ................................ 2006-323966
Jul. 25, 2007 (JP) ................................ 2007-193295

(51) Int. Cl.
*H04B 10/18* (2006.01)
*H04B 10/08* (2006.01)
*H04B 10/12* (2006.01)

(52) U.S. Cl.
USPC ............... 398/29; 398/81; 398/147; 398/159; 398/209

(58) Field of Classification Search
USPC ............... 398/29, 81, 147, 159, 209
See application file for complete search history.

(56) References Cited

U.S. PATENT DOCUMENTS

| 2002/0141692 A1* | 10/2002 | Hung ............................ 385/24 |
| 2003/0043440 A1* | 3/2003 | Suzaki et al. .................. 359/189 |
| 2004/0151506 A1* | 8/2004 | Shiramizu et al. ............ 398/140 |
| 2007/0065162 A1* | 3/2007 | Kikuchi ........................ 398/208 |

FOREIGN PATENT DOCUMENTS

| JP | 1995221705 A | 8/1995 |
| JP | 1996321805 A | 12/1996 |
| JP | 1997326755 A | 12/1997 |
| JP | 1998276172 A | 10/1998 |

(Continued)

OTHER PUBLICATIONS

Kikuchi, PCT/2003/016106, WO2004/107610 machine translation Dec. 2004.*

(Continued)

*Primary Examiner* — Jessica Stultz
*Assistant Examiner* — Michael Carter

(57) ABSTRACT

A dispersion determining apparatus comprises a received waveform monitoring part (1) and a dispersion amount determining part (4). The received waveform monitoring part (1) has a waveform monitoring circuit (2) that samples data from the received waveform of a received signal having propagated along a transmission path, and a histogram extracting circuit (3) that extracts, based on the sampled data obtained by the waveform monitoring circuit (2), a histogram data representative of the intensity distribution in the voltage direction of the received waveform. The dispersion amount determining part (4) has a polarized wave dispersion estimating circuit (7) that determines the horizontally asymmetric degree of a received eye-pattern waveform of the received waveform obtained by analyzing the histogram data extracted by the received waveform monitoring part (1) and then estimates, based on the determined asymmetric degree, a polarized wave dispersion amount in the transmission path.

24 Claims, 17 Drawing Sheets

FOREIGN PATENT DOCUMENTS

| | | |
|---|---|---|
| JP | 2000358015 A | 12/2000 |
| JP | 2001094535 A | 4/2001 |
| JP | 2002033701 A | 1/2002 |
| JP | 2002208892 A | 7/2002 |
| JP | 2002261692 A | 9/2002 |
| JP | 2004007150 A | 1/2004 |
| JP | 2004222240 A | 8/2004 |
| JP | 2004356742 A | 12/2004 |
| JP | 2005159553 A | 6/2005 |
| WO | 9928723 A | 6/1999 |
| WO | WO2004107610 | * 12/2004 |

OTHER PUBLICATIONS

International Search Report for PCT/JP2007/065900 mailed Oct. 9, 2007.

* cited by examiner

Fig. 1 -- RELATED ART --

-- RELATED ART --

-- RELATED ART --

DISPERSION DETERMINING APPARATUS AND AUTOMATIC DISPERSION COMPENSATING SYSTEM USING THE SAME

TECHNICAL FIELD

The present invention relates to a dispersion detecting apparatus for detecting an amount of polarization dispersion or both an amount of wavelength dispersion and an amount of polarization dispersion from a transmission waveform that has been degraded by polarization dispersion or a combination of polarization dispersion and wavelength dispersion in a high-speed optical transmission system, and an automatic dispersion compensating system using such a dispersion detecting apparatus.

BACKGROUND ART

The sharp increase in the network capacity in recent years has required optical transmission systems to have a larger capacity. Recently, there has been developed at a rapid rate a wavelength division multiplex (WDM) optical transmission system of 40 Gbps which is capable of higher-capacity transmission than the WDM transmission system of 10 Gbps that has been in practical use at present.

The optical transmission system of 40 Gbps not only suffers the waveform degradation caused by wavelength dispersion which has been problematic so far, but also is highly susceptible to a waveform degradation caused by polarization dispersion, resulting in greatly limited distances over which optical signals are transmitted.

The polarization dispersion is a dispersion caused by the different propagation delay times of polarized components of optical pulses (two optical modes including a TE mode and a TM mode) because of the deviation of a slightly elliptical optical fiber from a true circle and stresses applied to the optical fiber. Generally, the polarization dispersion is greater as the optical signal is transmitted at a higher rate and over a longer distance.

Old optical fibers which have been laid out so far (mainly outside Japan) include optical fibers having a large polarization dispersion in excess of 1 ps/km$^{1/2}$. If an optical signal is transmitted through such an optical fiber over 100 km, for example, then a differential group delay (DGD) $\Delta T$ caused in the two polarized components is of about 10 ps which is ⅖ of one time slot of 25 ps of the optical signal that has a rate of 40 Gbps. Therefore, the optical signal has its waveform greatly degraded and is transmitted over a largely limited distance.

The polarization dispersion varies with time due to changes in the temperature and changes in the transmission path environment that are caused by stresses such as fiber touch (stresses developed in the optical fiber by a touch of the optical fiber by hand and winds applied to the optical fiber).

Fluctuations in the polarization dispersion caused by temperature changes are disclosed in Non-patent document 1, for example. According to Non-patent document 1, a correlation has been pointed out between varied amounts of polarization dispersion and ambient temperature changes of a single-mode fiber in an underground conduit over a distance of 48.8 km. The results shown indicate that temperature changes cause the polarization dispersion to vary at a relatively low rate in the order of minutes.

According to Non-patent document 2, the frequency of polarization dispersion fluctuations due to mechanical vibration has been reported. It has been reported in Non-patent document 2 that polarization dispersion fluctuations generally have a rate of kHz, i.e., several msec. In order to compensate for polarization dispersion fluctuations with high accuracy, it is therefore necessary not only to automatically compensate for polarization dispersion fluctuations depending on the state of the transmission path at the time of a system startup (non-adjustment, adjustment-free), but also to dynamically monitor the effect of a polarization dispersion and compensate for polarization dispersion fluctuations while following the polarization dispersion at a high rate in the order of msecs. while the system is in operation.

Furthermore, the actual environment is affected by a wavelength dispersion which has been greatly responsible for waveform degradations in the optical transmission systems available so far, in addition to the polarization dispersion described above. Consequently, the waveform of an optical signal that is received in the actual environment is complexly degraded by a combination of plural dispersion factors that exist at the same time. Even if attempts are made to compensate for complex waveform degradations caused by such plural dispersion factors with an existing wavelength dispersion compensator or an equalizer for compensating for general waveform degradations, no convergent solution can be obtained, failing to optimally compensate for the waveform degradations.

For making it possible to transmit optical signals over a distance of several hundreds km with an optical transmission system of 40 Gbps, the following two schemes are required:

(1) a scheme for automatically compensating for polarization dispersion at a rate in the order of msecs., and (2) a scheme for optimally compensating for both waveform degradations caused by polarization dispersion and waveform degradations caused by wavelength dispersion while polarization dispersion and wavelength dispersion are occurring simultaneously.

A technology for automatically compensating for wavelength dispersion and polarization dispersion is disclosed in Patent document 1, for example. Specifically, an automatic dispersion compensating system disclosed in Patent document 1 includes a dispersion compensator for automatically compensating for wavelength dispersion of an optical signal transmitted through an optical transmission path, and a dispersion compensator for automatically compensating for polarization dispersion of the optical signal transmitted through the optical transmission path. Each of the dispersion compensators comprises a variable dispersion compensating device, a control monitor circuit, and a control circuit.

Patent document 2 discloses a technology for optimally controlling an amount of compensation for waveform degradations based on information about a code error of an optical signal. Specifically, in an automatic dispersion compensating system disclosed in Patent document 2, as shown in FIG. 1, an optical signal is amplified by optical amplifier 101 and thereafter sent to variable dispersion compensator 102. An output signal from variable dispersion compensator 102 is amplified by optical amplifier 103 and thereafter converted into an electric signal by photodetector 104. An output signal from photodetector 104 is amplified by amplifying circuit 105, subjected to a clock reproducing and identifying process by clock reproducing and identifying circuit 106, and subjected to series-to-parallel conversion by series-to-parallel converting circuit 107. Error correcting circuit 108 performs a code process on an output signal from series-to-parallel converting circuit 107 to detect a code error, and sends information about the detected code error to control circuit 109 through a feedback loop. Control circuit 109 optimally controls variable dispersion compensator 102 based on the information sent from error correcting circuit 108.

Patent document 3 discloses a technology for separating two dispersions that are primarily responsible for transmission quality degradations, i.e., wavelength dispersion and polarization dispersion, using a general transmission quality monitor instead of a wavelength dispersion monitor. Examples of transmission quality monitor include an error measurer, a transmission quality monitor for measuring a Q value, etc. An automatic dispersion compensating system disclosed in Patent document 3 includes, as shown in FIG. 2, optical receiver 110 comprising photodiode (PD) 111 for converting an optical signal into an electric signal, equalizing amplifier 114 for amplifying an electric signal and shaping the waveform thereof, equalizing amplifier 114 comprising preamplifier 112 and amplifier 113, clock extracting circuit 115 for extracting a clock signal from an output signal from equalizing amplifier 114, and identifying circuit 116 for identifying the state of the output signal from equalizing amplifier 114. Status monitor 117 monitors the statuses of PD 111, equalizing amplifier 114, and identifying circuit 116. Another automatic dispersion compensating system disclosed in Patent document 3 includes, as shown in FIG. 3, includes PMD compensator 118 that is controlled depending on a monitored result from PMD monitor 119 for compensating for PMD of a received optical signal that is input to dispersion compensator 120. Dispersion compensator 52 is controlled depending on a monitored result from dispersion monitor 122 which monitors optoelectric transducer (O/E) 121.

Specific technologies for wavelength dispersion compensation are disclosed in Patent documents 4 through 6 and Non-patent documents 3, 4, for example. Variable wavelength dispersion compensating devices for wavelength dispersion compensation include optical devices using a VIPA (Virtually Imaged Phased Array) disclosed in Non-patent document 5 and an FBG (Fiber Bragg Grating) disclosed in Non-patent document 6.

Specific technologies for polarization dispersion compensation include optically processing, optoelectrically processing, and electrically processing systems disclosed in Non-patent document 7, for example. The optically processing and optoelectrically processing systems require a polarized state to be controlled. Another control system for polarization dispersion compensation monitors a ½ frequency component and a ¼ frequency component of a clock signal included in an optical signal which has been compensated for polarization dispersion, and controls a polarized state, as disclosed in Non-patent documents 8, 9.

However, the dispersion compensating technologies according to the background art as described above have some problems. The problems of the respective dispersion compensating technologies will be described below.

(1) Specific technologies for polarization dispersion compensation include some technologies for performing optical processing and optoelectrical processing sequences. Most of those polarization dispersion compensating technologies need the polarized state to be controlled. However, it is difficult to realize polarization control on polarization dispersion that varies with time at a high rate in the order of msecs.

(2) The technology disclosed in Patent document 1 does not separate a control process for compensating for wavelength dispersion and a control process for compensating for polarization dispersion, and does not make the control processes operable together. A process required to make the control processes operable together tends to make the apparatus larger in size and higher in cost.

(3) The technology disclosed in Patent document 2 is effective to make the apparatus smaller in size and lower in cost because the dispersion identifying process and the control process are electrically performed. However, if dispersion fluctuations are developed owing to certain conditional changes, causing a code error, then the technology does not provide data for determining whether the dispersion is to be compensated for excessively (positively) or decrementally (negatively) from the present level. Generally, a method of finding an optimum compensating point is adopted by using an algorithm such as a dithering process for expressing gradations with randomly generated dots, as disclosed in Patent document 7, or a hill-climbing process for determining, as a next search course, one of routes which is likely to be closest to the goal, when next candidate vertexes are developed from the present vertex. However, the technology disclosed in Patent document 2 fails to initially determine whether the error rate decreases or increases when the amount of dispersion compensation increases, because it does not provide the above data. Specifically, when the amount of dispersion compensation is controlled based on the error rate, a long time is required until an optimum value is reached. Furthermore, if the amount of dispersion compensation is controlled at coarse intervals, then a convergent point for the system may possibly be not found. Consequently, the intervals at which the amount of dispersion compensation is controlled have to be highly accurate to a certain degree. With the highly accurate control intervals, the time required until the system converges and the number of repetitive cycles are increased. It is thus difficult for the technology to be applied to a system which needs to compensate for the dispersion at a high rate in the order of msecs.

(4) Of the technologies disclosed in Patent document 3, the automatic dispersion compensating system shown in FIG. 2 is a general automatic dispersion compensating system for extracting a control from an ordinary waveform monitor, and has no specific algorithm and configuration reviewed as to how to specifically separate the cause of wavelength dispersion and the cause of polarization dispersion. The automatic dispersion compensating system shown in FIG. 3 requires a monitor, a control device, and a dispersion compensator for each of wavelength dispersion and polarization dispersion, in the same manner as described with respect to (1). Since the dispersion compensator and its peripherals are mostly made up of optical components, the apparatus tends to be larger in size and higher in cost due to an increased number of components, and hence is less liable to be made versatile.

Patent document 1: JP-A No. 7-221705
Patent document 2: JP-A No. 2002-208892
Patent document 3: JP-A No. 2004-7150
Patent document 4: JP-A No. 8-321805
Patent document 5: JP-A No. 9-326755
Patent document 6: JP-A No. 10-276172
Patent document 7: JP-A No. 2002-33701
Non-patent document 1: "J. Cameron et al.: Time evolution of polarization—mode dispersion for aerial and buried cables, Proc. OFC98, pp 240-241"
Non-patent document 2: "H. Brow et al.: Measurement of the Maximum Speed of PMD Fluctuations in Installed Field Fiber, Proc. OFC'99, pp 83-85"
Non-patent document 3: "G. Ishikawa et al., "DEMONSTRATION OF AUTOMATIC DISPERSION EQUALIZATION IN 40 Gbits/s OTDM TRANSMISSION", ECOC '98, pp. 519-520"
Non-patent document 4: "Y. Akiyama et al., "AUTOMATIC DISPERSION EQUALIZATION IN 40 Gbits/s TRANSMISSION BY SEAMLESS-SWITCHING BETWEEN MULTIPLE SIGNAL WAVELENGTHS", ECOC '99, pp. I-150-151"

Non-patent document 5: "M. Shirasaki et al., "Dispersion Compensation Using The Virtually Imaged Phased Array", APCC/OECC '99, pp. 1367-1370, 1999"

Non-patent document 6: "M. M. Ohn et al., "Tunable Fiber Grating Dispersion Using a Piezoelectric Stack", OFC'97 WJ3"

Non-patent document 7: "H. Bulow et al., "Optical and electric PMD compensation", OFC'03, p. 541"

Non-patent document 8: "H. Ooi et al., "Automatic Polarization—Mode Dispersion Compensation in 40 Gbits/s Transmission", IOOC'99, WE5"

Non-patent document 9: "D. Sandel et al., "Automatic polarization mode dispersion compensation in 40 Gbits/s optical transmission system", Electron. Lett., 1998, pp 2258-2259"

Non-patent document 10: "Makoto Nagaoka, Iwanami Lecture Series Software Science 14 "Knowledge and Deduction", Iwanami Shoten, 1988, pp. 114-120"

DISCLOSURE OF THE INVENTION

It is an object of the present invention to provide a dispersion detecting apparatus which is capable of compensating polarization dispersion at a high rate in the order of msecs. and an automatic dispersion compensating system using such a dispersion detecting apparatus.

Another object of the present invention is to provide a dispersion detecting apparatus which is capable of compensating polarization dispersion at a high rate in the order of msecs. and of separating the cause of waveform degradations due to polarization dispersion and the cause of waveform degradations due to wavelength dispersion while polarization dispersion and wavelength dispersion are occurring simultaneously, and an automatic dispersion compensating system using such a dispersion detecting apparatus.

To achieve the above objects, a dispersion detecting apparatus according to the present invention adopts the following scheme:

First, a process of compensating for a waveform degradation caused by polarization dispersion will be described below.

As described above, polarization dispersion is responsible for a waveform degradation which is produced when two waves, i.e., a slow component and a fast-component, of an optical waveform which are caused by a differential group delay (DGD). A transfer function z is expressed by the equation (1):

$$(1-\gamma)+\gamma z^{-DGD/1UI} \quad (1)$$

where γ represents the proportion of the energy of the delayed wave to the energy of the input wave, DGD the differential group delay, and 1UI one symbol length.

Waveform degradations caused by polarization dispersion are mainly characterized in that, except when power division ratio γ in the above transfer function is 1:1, the eye opening size of a received eye pattern waveform is asymmetric at opposite lateral ends within one symbol.

Therefore, the received waveform is sampled while an identification threshold value is varied in an amplitude direction, and an eye opening size in a voltage direction of a received eye pattern waveform is asymmetric at opposite lateral ends in one symbol.

By detecting eye opening sizes at a plurality of phase points of the received eye pattern waveform and comparing the detected eye opening sizes, it is possible to determine an extent of lateral asymmetry of the received eye pattern waveform and estimate an amount of polarization dispersion from the determined extent of lateral asymmetry.

A dispersion detecting apparatus for thus detecting an amount of polarization dispersion according to a first aspect comprises a received waveform monitor processor including a waveform monitoring circuit for sampling data from the received waveform of a received signal transmitted through a transmission path, and a histogram extracting circuit for extracting histogram data representing an intensity distribution of the received waveform in a voltage direction based on the sampled data from the waveform monitoring circuit, and an amount-of-dispersion detector including a polarization dispersion estimating circuit for determining an extent of lateral symmetry of a received eye pattern waveform of the received waveform which is produced by analyzing the histogram data extracted by the received waveform monitor processor, and estimating an amount of polarization dispersion in the transmission path based on the determined extent of lateral symmetry.

The amount-of-dispersion detector further includes a voltage-direction eye opening detector for detecting an eye opening size in the voltage direction of the received eye pattern waveform. The polarization dispersion estimating circuit acquires the detected eye opening size in the voltage direction of the received eye pattern waveform each time the phase of the identification clock is varied, compares the detected eye opening size to determine an extent of lateral asymmetry of the received eye pattern waveform, and estimates the amount of polarization dispersion based on the determined extent of lateral asymmetry.

If power division ratio γ is 1:1, i.e., if the divided power levels are equal to each other, then the received eye pattern waveform has its eye opening deformed along the voltage axis, and remains laterally symmetric.

The polarization dispersion estimating circuit compares the eye opening size in the voltage direction at the lateral ends of one symbol length. If the eye opening size is not asymmetric, then the polarization dispersion estimating circuit judges that γ=0 or 50%. Thereafter, the polarization dispersion estimating circuit estimates a specific eye opening size in the voltage direction thereby to estimate a value of γ.

An amount of dispersion is detected using lookup data representative of the correlated relationship between amounts of polarization dispersion and extents of lateral asymmetry of the eye pattern waveform. Accordingly, the amount of dispersion can be detected fast.

A process of compensating for a waveform degradation caused by polarization dispersion and wavelength dispersion will be described below.

Waveform degradations caused by wavelength dispersion are characterized in that the cross point fluctuates upwardly or downwardly from an intermediate position and the margin in a phase direction of the eye pattern waveform is reduced, as opposed to the waveform degradations caused by polarization dispersion.

Consequently, in addition to detecting the eye opening size in the voltage direction of the received eye pattern waveform as described above, an eye opening size in the phase direction of the received eye pattern waveform and an amount of fluctuation of the cross point are detected, and an amount of wavelength dispersion can be estimated by processing the eye opening size in the phase direction and the amount of fluctuation of the cross point.

A dispersion detecting apparatus for thus detecting an amount of polarization dispersion and an amount of wavelength dispersion according to a second aspect comprises a received waveform monitor processor including a waveform monitoring circuit for sampling data from the received waveform of a received signal transmitted through a transmission path, and a histogram extracting circuit for extracting histogram data representing an intensity distribution of the received waveform in a voltage direction based on the sampled data from the waveform monitoring circuit, and an amount-of-dispersion detector including a polarization dispersion estimating circuit for determining an extent of lateral symmetry of a received eye pattern waveform of the received waveform which is produced by analyzing the histogram data extracted by the received waveform monitor processor, and estimating an amount of polarization dispersion in the transmission path based on the determined extent of lateral symmetry, and a wavelength dispersion estimating circuit for estimating an amount of wavelength dispersion in the transmission path based on an amount of fluctuation from a central position of a cross point and an eye opening size in a phase direction of the received eye pattern waveform.

The amount-of-dispersion detector specifically operates as follows: First, the amount-of-dispersion detector initially detects an amount of fluctuation of the cross point of the received eye pattern waveform. If there is no fluctuation, then the amount-of-dispersion detector estimates that there is no wavelength dispersion, and goes to the above routine for detecting an amount of polarization dispersion. Conversely, if there is cross-point fluctuation, then the amount-of-dispersion detector goes to the above routine for detecting an amount of wavelength dispersion. After the amount-of-dispersion detector has detected an amount of wavelength dispersion, it goes to the routine for detecting an amount of polarization dispersion. In this manner, the causes of dispersion can separately be determined.

Amounts of dispersion are detected using lookup data representative of the correlated relationship between amounts of polarization dispersion and extents of lateral asymmetry of the eye pattern waveform and lookup data representative of the correlated relationship between amounts of wavelength dispersion and eye opening sizes in the phase direction and amounts of fluctuation of the cross point of the received eye pattern waveform. Accordingly, the amounts of dispersion can be detected fast.

An automatic dispersion compensating system which incorporates the above dispersion detecting apparatus will be described below.

The automatic dispersion compensating system comprises an optoelectric transducer circuit for converting a received signal transmitted through the transmission path from an optical signal into an electric signal, an electric dispersion compensator for compensating for a waveform degradation, caused by polarization dispersion, of the received signal as converted into the electric signal by the optoelectric transducer circuit, a dispersion detecting apparatus for detecting an amount of dispersion based on a received waveform of the received signal which has passed through the electric dispersion compensator, a clock data recovery circuit for reproducing and extracting a clock signal, and recovering a data signal, from the signal that has passed through the electric dispersion compensator, a demultiplexer for converting the data signal output from the clock data recovery circuit from a series signal into a parallel signal, and an adaptive amount-of-compensation controller for controlling a compensation coefficient of the electric dispersion compensator and an identification threshold value of the clock data recovery circuit based on the amount of polarization dispersion which is detected by the dispersion detecting apparatus. For determining a compensation coefficient and an identification threshold value, the adaptive amount-of-compensation controller may adopt, for example, a process of storing, in advance in a lookup data table, lookup data representative of the correlated relationship between amounts of dispersion and compensation coefficients and identification threshold values, and using the stored lookup data.

The dispersion detecting apparatus described above can estimate an amount of waveform degradation due to polarization dispersion and detect an amount of polarization dispersion when the automatic dispersion compensating system is both initially set up and in service.

Even if both polarization dispersion and wavelength dispersion are present, the causes of dispersion can separately be determined and amounts of dispersion can be estimated by a single apparatus.

The automatic dispersion compensating system which incorporates the dispersion detecting apparatus can have its routine of operation all electrically processed without the need for the control of optical components such as polarizers, etc. Accordingly, the automatic dispersion compensating system may be integrated in a smaller size and lower in cost than systems employing optical components.

Since the automatic dispersion compensating system detects amounts of dispersion using information that is generated by fast monitoring the received waveform and lookup data representative of the correlated relationship between amounts of waveform degradation and amounts of dispersion, the number of repeated processing sequences performed by the automatic dispersion compensating system until an amount of dispersion is detected may be smaller than if information such as a code error ratio is used, and hence the automatic dispersion compensating system is sufficiently capable of automatically compensating for polarization dispersion which fluctuates fast in the order of msecs.

BEST MODE FOR CARRYING OUT THE INVENTION

The best mode for carrying out the invention will be described below with reference to the drawings.

(1st Exemplary Embodiment)

Figure 1:
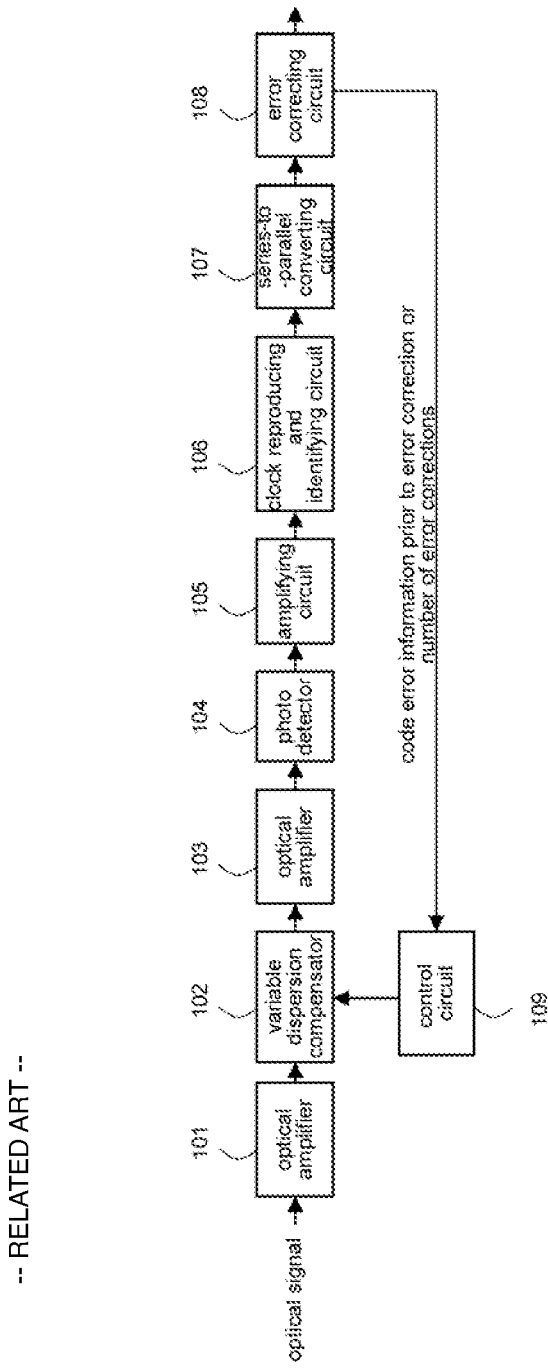
FIG. 1 is a diagram showing a configurational example of an automatic dispersion compensating system according to the background art.
Figure 2:
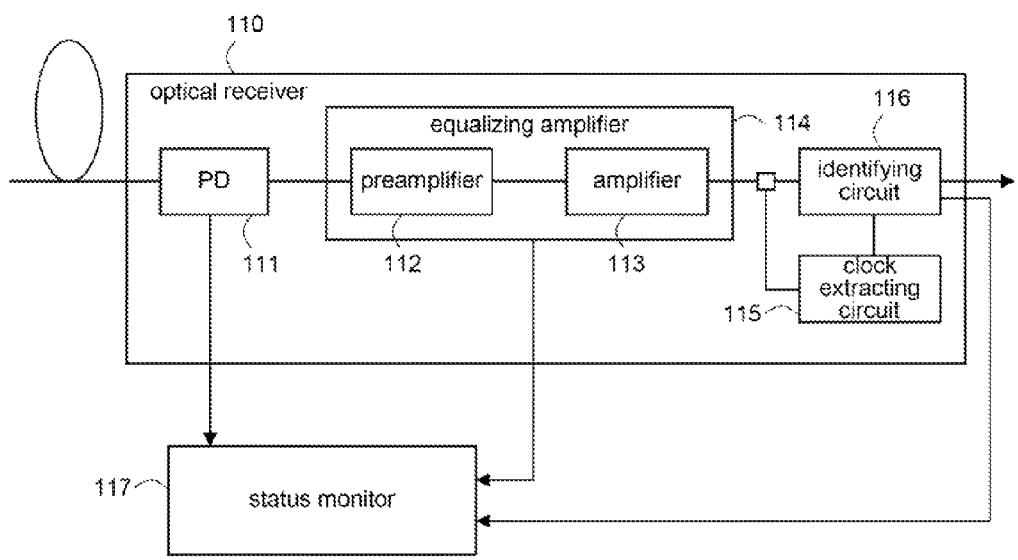
FIG. 2 is a diagram showing another configurational example of an automatic dispersion compensating system according to the background art.
Figure 3:
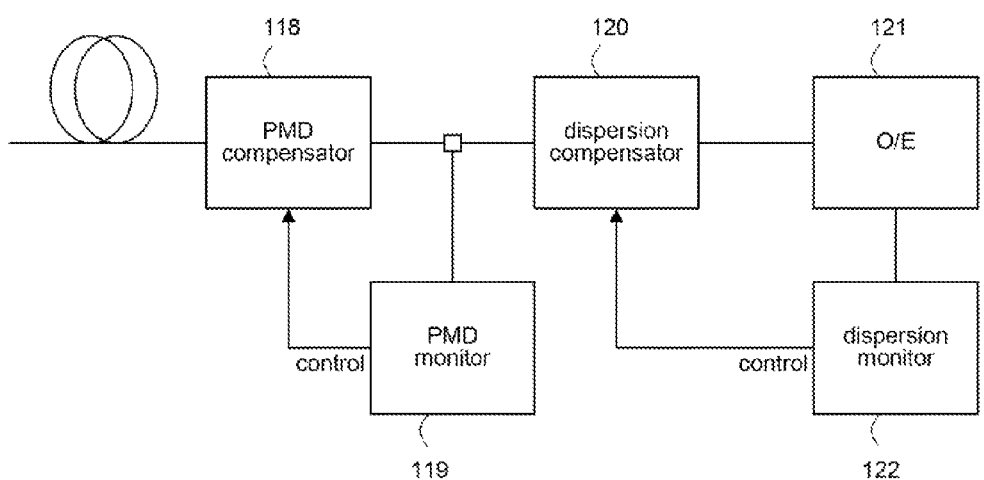
FIG. 3 is a diagram showing still another configurational example of an automatic dispersion compensating system according to the background art.
Figure 4:
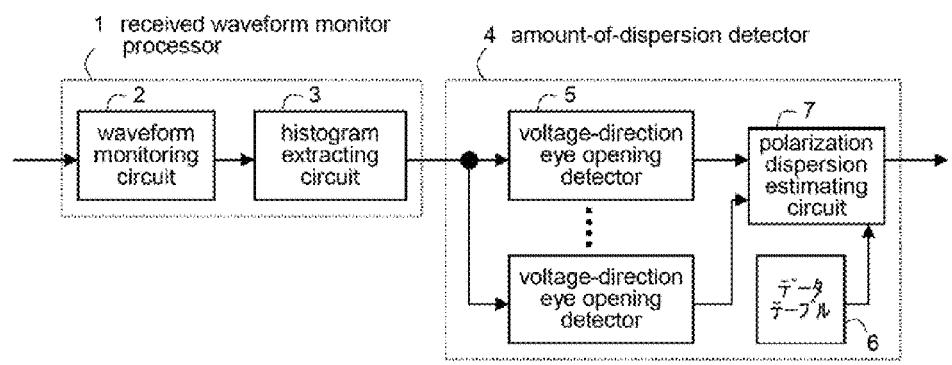
FIG. 4 is a block diagram showing the configuration of a dispersion detecting apparatus according to a first exemplary embodiment of the present invention.

FIG. 4 is a block diagram showing the configuration of a dispersion detecting apparatus according to a first exemplary embodiment of the present invention. The dispersion detecting apparatus according to the present exemplary embodiment detects an amount of polarization dispersion in an optical fiber serving as a transmission path.

As shown in FIG. 4, the dispersion detecting apparatus according to the present exemplary embodiment comprises received waveform monitor processor 1 for monitoring a received waveform which is degraded of a received signal that is received from an optical fiber, and amount-of-dispersion detector 4 for detecting an amount of polarization dispersion of the received waveform which is monitored by received waveform monitor processor 1.

Waveform monitor processor 1 comprises waveform monitoring circuit 2 and histogram extracting circuit 3.

Waveform monitoring circuit 2 monitors the received waveform and samples data from the monitored received waveform.

Histogram extracting circuit 3 integrates and averages the sampled data from waveform monitoring circuit 2 to extract histogram data representing an intensity distribution of the received waveform in a voltage direction.

Amount-of-dispersion detector 4 comprises voltage-direction eye opening detectors 5, lookup data table 6, and polarization dispersion estimating circuit 7.

Voltage-direction eye opening detector 5 detects an eye opening size in the voltage direction (amplitude direction) of a received eye pattern waveform representative of the received waveform in the form of an eye pattern, which is obtained by analyzing the histogram data extracted by waveform monitor processor 1. Plural voltage-direction eye opening detectors 5 detect a plurality of eye opening sizes in the voltage direction at a plurality of phase points in a phase direction (time-axis direction) of a clock.

Lookup data table 6 stores, in advance, lookup data representative of the correlated relationship between amounts of polarization dispersion and extents of lateral asymmetry of the eye pattern waveform.

Polarization dispersion estimating circuit 7 determines an extent of lateral asymmetry of the received eye pattern waveform by comparing the eye opening sizes in the voltage direction which are detected by voltage-direction eye opening detectors 5.

As described above, waveform degradations caused by polarization dispersion are characterized in that, except when power division ratio γ is 1:1, the eye opening size of a received eye pattern waveform is asymmetric at opposite lateral ends within one symbol.

Therefore, polarization dispersion estimating circuit 7 can uniquely estimate an amount of polarization dispersion by comparing the determined extent of lateral asymmetry with the lookup data in lookup data table 6.

According to the present exemplary embodiment, as described above, an amount of polarization dispersion is detected based on the extent of lateral asymmetry of the received eye pattern waveform which represents a typical feature of waveform degradations caused by polarization dispersion. According to the background art, an amount of polarization dispersion is estimated based on an associative map representing an association between waveform degradation patterns and causes of dispersion. Since accumulated data serving as a basis for the associative map may be fewer according to the present exemplary embodiment than according to the background art, the apparatus can be reduced in size according to the present exemplary embodiment. According to the present exemplary embodiment, furthermore, an amount of polarization dispersion can be detected faster by simplifying the associative map.

Figure 5:
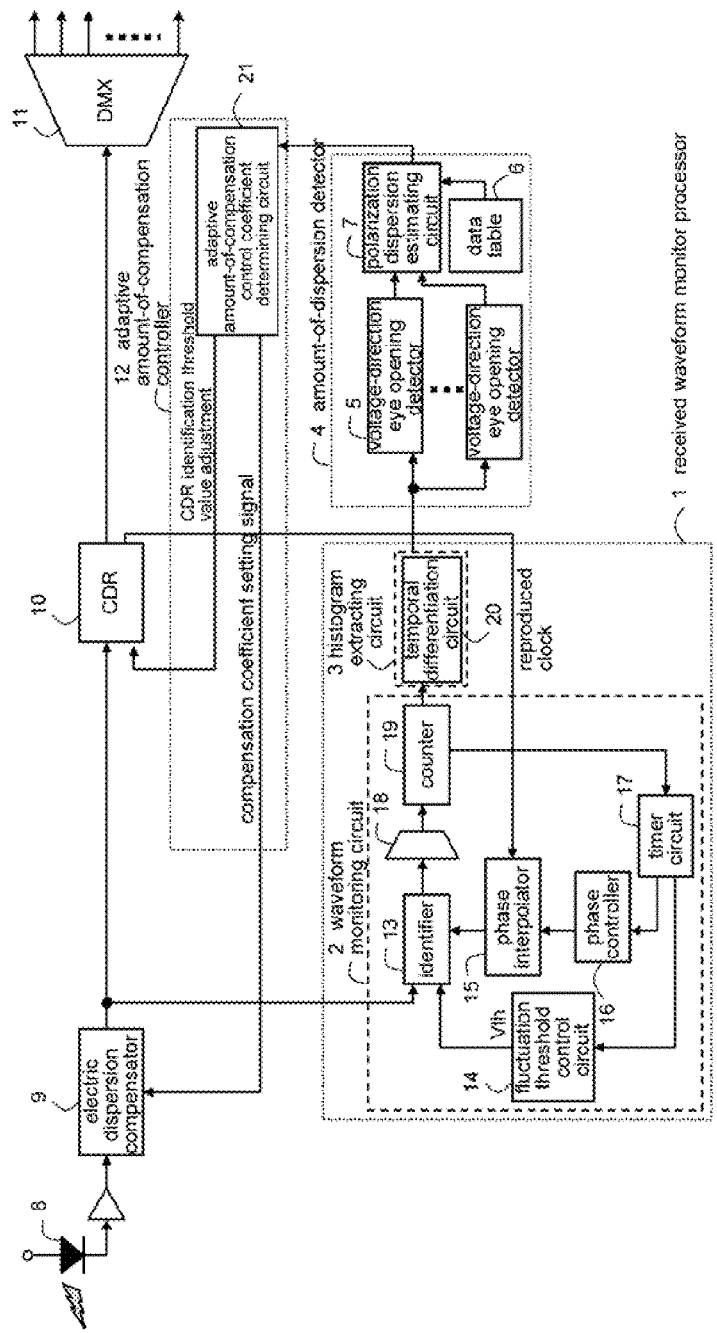
FIG. 5 is a diagram showing a configurational example of an automatic dispersion compensating system which employs the dispersion detecting apparatus shown in FIG. 4.

FIG. 5 is a diagram showing a configurational example of an automatic dispersion compensating system which employs the dispersion detecting apparatus shown in FIG. 4.

As shown in FIG. 5, the automatic dispersion compensating system according to the present example comprises received waveform monitor processor 1 described above, amount-of-dispersion detector 4 described above, optoelectric transducer circuit 8, electric dispersion compensator 9, clock data recovery (CDR) circuit 10, demultiplexer (DMX) 11, and adaptive amount-of-compensation controller 12.

Optoelectric transducer circuit 8 converts a received signal transmitted through an optical fiber from an optical signal into an electric signal.

Electric dispersion compensator 9 compensates for a waveform degradation, caused by polarization dispersion, of the received signal as converted into the electric signal by optoelectric transducer circuit 8.

Clock data recovery circuit 10 reproduces and extracts a clock signal, and recovers a data signal, from the signal that has passed through electric dispersion compensator 9.

Demultiplexer 11 converts the data signal which has been CDR-processed by clock data recovery circuit 10 from a series signal into a parallel signal.

Waveform monitoring circuit 2 comprises identifier 13, fluctuation threshold control circuit 14, phase interpolator 15, phase controller 16, timer circuit 17, series-to-parallel converting circuit 18, and counter 19.

Identifier 13 samples data that are higher than an identification threshold value adjusted by fluctuation threshold control circuit 14 from the received waveform that has passed through electric dispersion compensator 9, at a timing based on an identification clock whose phase has been adjusted by phase interpolator 15 and phase controller 16.

Figure 6:
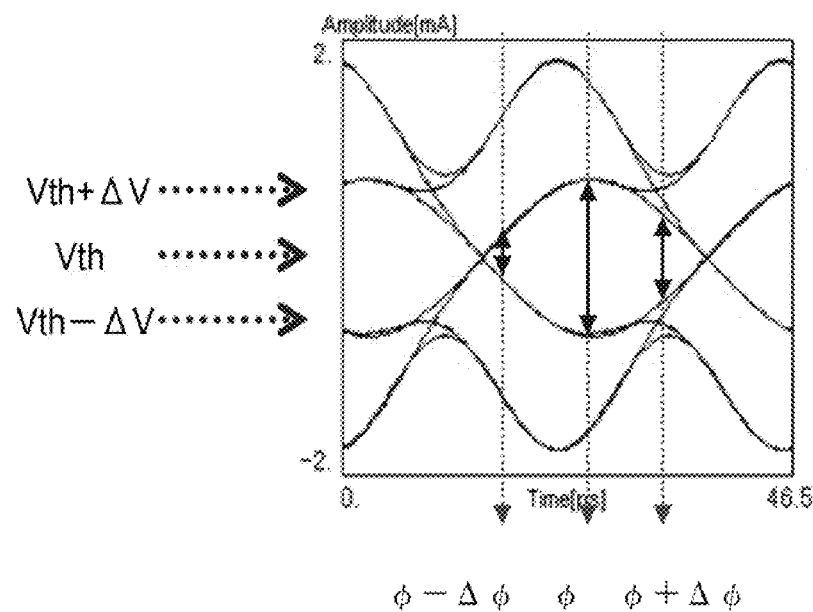
FIG. 6 is a diagram illustrative of the principles for estimating an amount of polarization dispersion from a waveform which is degraded by polarization dispersion.

Specifically, waveform monitoring circuit 2 samples data of the received waveform that has passed through electric dispersion compensator 9 while identification threshold value th of identifier 13 is being varied in the voltage direction by fluctuation threshold control circuit 14, as shown by a received eye pattern waveform in FIG. 6, and also while the phase of the identification block given to identifier 13 is being varied by phase interpolator 15 and phase controller 16. The received eye pattern waveform shown in FIG. 6 is plotted under the conditions that DGD is 20 ps and power division ratio γ is 2:1.

The sampled data produced by identifier 13 are converted from series data into parallel data by series-to-parallel converting circuit 18. Counter 19 counts the number of the sampled data. Timer circuit 17 controls the timing at which to vary the identification threshold value with fluctuation threshold control circuit 14 and also the timing at which to vary the phase with phase interpolator 15 and phase controller 16, depending on the count produced by counter 19.

Histogram extracting circuit 3 comprises temporal differentiation circuit 20 which integrates and averages the sampled data from waveform monitoring circuit 2 to extract histogram data.

Specifically, temporal differentiation circuit 20 calculates the difference between the count of sampled data which have been produced by sampling the received waveform for a fixed period of time while the identification threshold value of identifier 13 is being fixed, and the count of sampled data which have been produced by sampling the received waveform for a fixed period of time while the identification threshold value of identifier 13 is subsequently varied one step, and accumulates the differential data each time the identification threshold value is varied. In this manner, temporal differentiation circuit 20 calculates an intensity distribution of the received waveform in the voltage direction.

Amount-of-dispersion detector 4 detects an eye opening size in the voltage direction of the received eye pattern waveform, which is obtained by analyzing the histogram data extracted by waveform monitor processor 1 with voltage-direction eye opening detectors 5, repeatedly at a plurality of phase points.

Polarization dispersion estimating circuit 7 estimates an amount of polarization dispersion by determining an extent of lateral asymmetry of the received eye pattern waveform and comparing the determined extent of lateral asymmetry with the lookup data in lookup data table 6. The estimated amount of polarization dispersion is output as a detected amount of polarization dispersion.

Adaptive amount-of-compensation controller 12 includes adaptive amount-of-compensation control coefficient determining circuit 21 for determining an optimum compensation coefficient of electric dispersion compensator 9 and an optimum value of the identification threshold value of clock data recovery circuit 10 based on the amount of polarization dispersion which is detected by amount-of-dispersion detector 4. For determining the optimum compensation coefficient and the identification threshold value, adaptive amount-of-compensation controller 12 may adopt, for example, a process of storing, in advance in a lookup data table, lookup data representative of the correlated relationship between amounts of polarization dispersion and compensation coefficients and identification threshold values, and using the stored lookup data.

Figure 7:
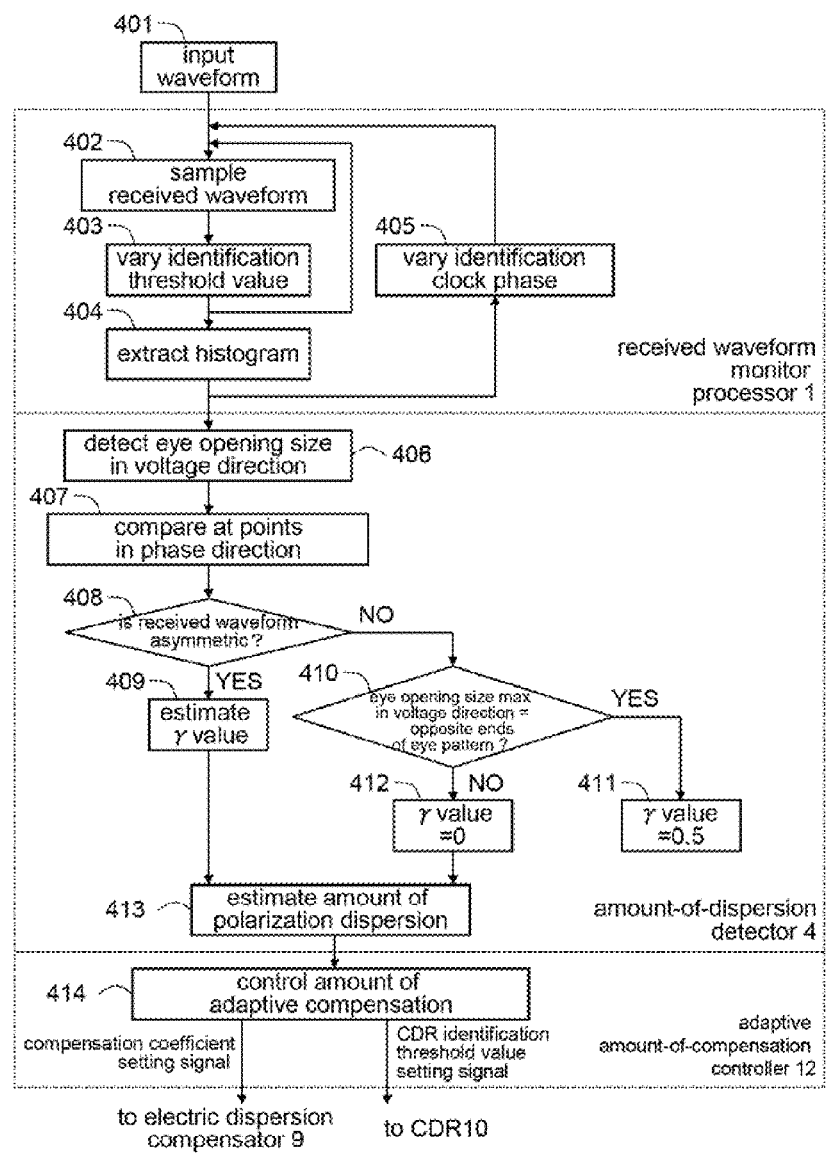
FIG. 7 is a flowchart of a general operating sequence of the automatic dispersion compensating system shown in FIG. 5.

FIG. 7 is a flowchart of a general operating sequence of the automatic dispersion compensating system shown in FIG. 5.

As shown in FIG. 7, received waveform monitor processor 1 is supplied with a received waveform from electric dispersion compensator 9 (step 401), samples the received waveform while varying the identification threshold value in the voltage direction (steps 402, 403), and extracts histogram data (step 404). Received waveform monitor processor 1 repeats steps 402 through 404 while varying the clock phase (step 405).

Then, amount-of-dispersion detector 4 detects a plurality of eye opening sizes in the voltage direction at a plurality of (two or three) phase points in the phase direction of the received eye pattern waveform which is obtained by analyzing the histogram data extracted by waveform monitor processor 1 (step 406), and compares the detected eye opening sizes thereby to determine an extent of lateral asymmetry of the received eye pattern waveform (steps 407, 408). If the eye opening sizes in the voltage direction are asymmetric as a result of comparison at the opposite lateral ends over one symbol length, then amount-of-dispersion detector 4 estimates power division ratio V (step 409). If the eye opening sizes in the voltage direction are symmetric, then amount-of-dispersion detector 4 determines whether the maximum value of the eye opening sizes in the voltage direction is at the opposite lateral ends of the received eye pattern waveform or not (step 410). If the maximum value is at the opposite lateral ends, then amount-of-dispersion detector 4 sets power division ratio γ to 0.5 (step 411). If the maximum value is not at the opposite lateral ends, then amount-of-dispersion detector 4 sets power division ratio γ to 0 (step 412). Amount-of-dispersion detector 4 also compares the extent of lateral asymmetry with the lookup data in lookup data table 6, thereby detecting an amount of polarization dispersion (step 413).

Thereafter, adaptive amount-of-compensation controller 12 determines an optimum compensation coefficient of electric dispersion compensator 9 and an optimum value of the identification threshold value of clock data recovery circuit 10 based on the amount of polarization dispersion which is detected by amount-of-dispersion detector 4, and sets the determined values in electric dispersion compensator 9 and clock data recovery circuit 10 (step 414).

According to the present example, as described above, an amount of polarization dispersion is detected based on the extent of lateral asymmetry of the received eye pattern waveform which represents a typical feature of waveform degradations caused by polarization dispersion. According to the background art, an amount of polarization dispersion is estimated based on an associative map representing an association between waveform degradation patterns and causes of dispersion. Since accumulated data serving as a basis for the associative map may be fewer according to the present example than according to the background art, the apparatus can be reduced in size according to the present example. According to the present example, furthermore, an amount of polarization dispersion can be detected faster by simplifying the associative map.

Figure 8:
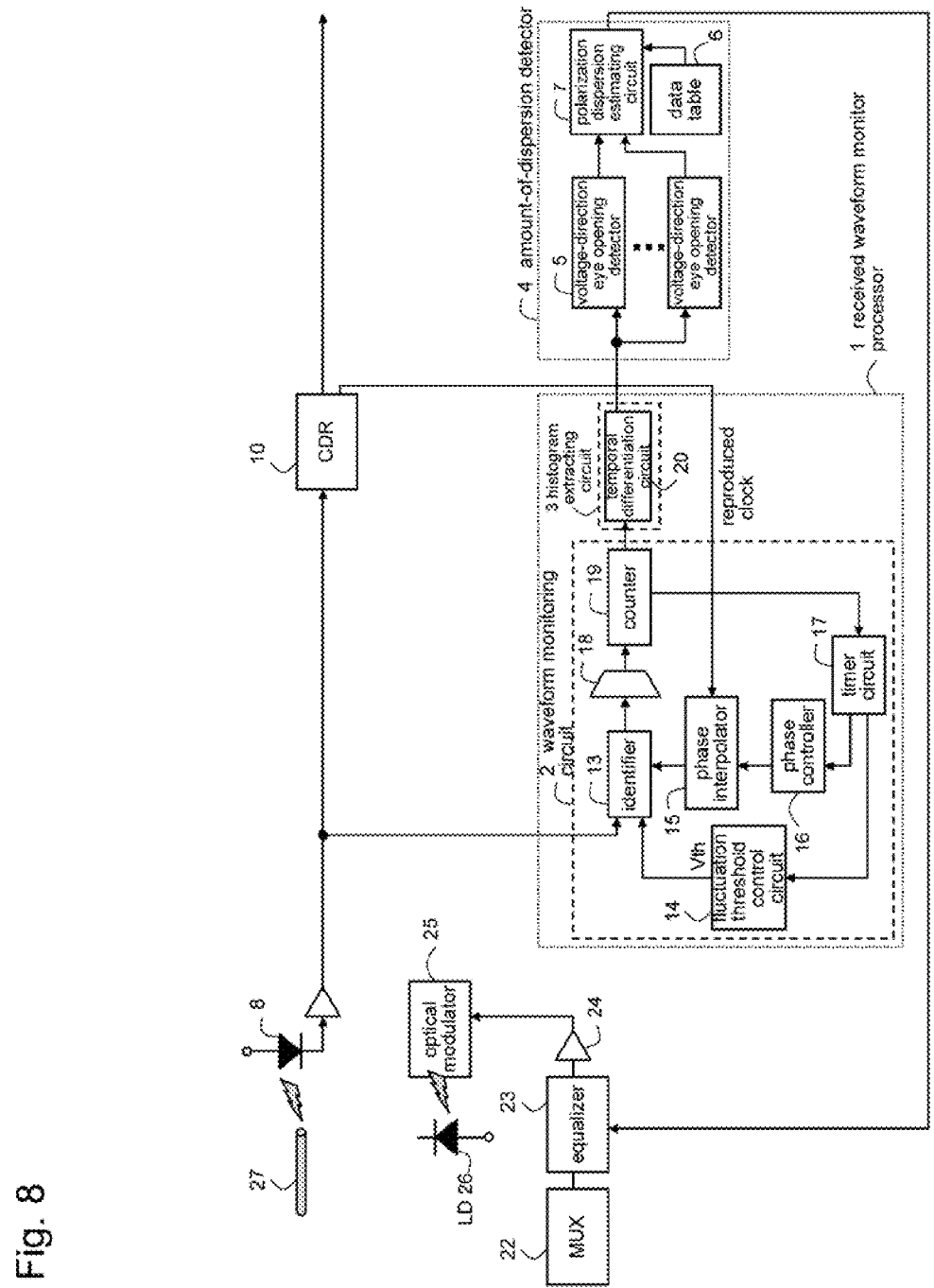
FIG. 8 is a diagram showing another configurational example of an automatic dispersion compensating system which employs the dispersion detecting apparatus shown in FIG. 4.

FIG. 8 is a diagram showing another configurational example of an automatic dispersion compensating system which employs the dispersion detecting apparatus shown in FIG. 4.

As shown in FIG. 8, the automatic dispersion compensating system according to the present example comprises a receiver including received waveform monitor processor 1 described above, amount-of-dispersion detector 4 described above, optoelectric transducer circuit 8, and clock data recovery circuit 10, and a transmitter including multiplexer (MUX) 22, electric equalizer circuit 23, optical modulator driver circuit 24, optical modulator 25, and laser diode 26.

Optoelectric transducer circuit 8 converts a received signal transmitted through optical fiber 27 from an optical signal into an electric signal.

Clock data recovery circuit 10 reproduces and extracts a clock signal, and recovers a data signal, from the received signal.

Received waveform monitor processor 1 monitors a received waveform received from optical fiber 27, and amount-of-dispersion detector 4 detects an amount of polarization dispersion of the received waveform which is monitored by received waveform monitor processor 1. Configurational and operational details of received waveform monitor processor 1 and amount-of-dispersion detector 4 are identical to those shown in FIG. 5 and will not be described in detail below.

Multiplexer 22 converts a transmission signal to be transmitted to a transmission destination from a parallel signal into a series signal.

Electric equalizer circuit 23 corrects frequency characteristics of the transmission signal based on the amount of polarization dispersion detected by amount-of-dispersion detector 4.

Optical modulator driver circuit 24 controls optical modulator 25 based on an output signal from electric equalizer circuit 23.

Optical modulator 25 modulates an optical signal emitted from laser diode 26 under the control of optical modulator driver circuit 24.

According to the present example, as described above, the amount of polarization dispersion which is detected by the receiver is fed back to the transmitter, which transmits the transmission signal that has been dispersion-equalized in anticipation of the amount of degradation of the waveform, to a reception destination, for thereby optimizing an amount of compensation.

(2nd Exemplary Embodiment)

Figure 9:
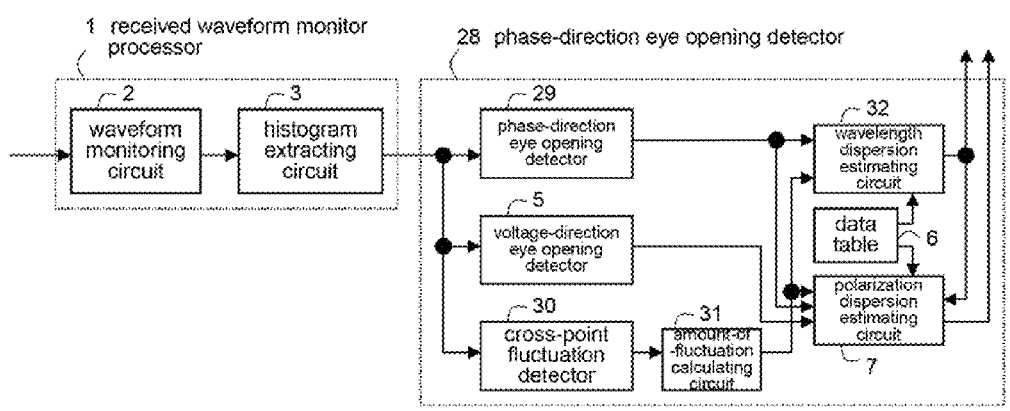
FIG. 9 is a block diagram showing the configuration of a dispersion detecting apparatus according to a second exemplary embodiment of the present invention.

FIG. 9 is a block diagram showing the configuration of a dispersion detecting apparatus according to a second exemplary embodiment of the present invention. The dispersion detecting apparatus according to the present exemplary embodiment separately detects an amount of wavelength dispersion and an amount of polarization dispersion in an optical fiber serving as a transmission path.

As shown in FIG. 9, the dispersion detecting apparatus according to the present exemplary embodiment comprises received waveform monitor processor 1 for monitoring a received waveform which is degraded that is received from an optical fiber, and amount-of-dispersion detector 28 for separately detecting an amount of wavelength dispersion and an amount of polarization dispersion of the received waveform which is monitored by received waveform monitor processor 1.

As with the first exemplary embodiment shown in FIG. 4, received waveform monitor processor 1 comprises waveform monitoring circuit 2 and histogram extracting circuit 3.

Waveform monitoring circuit 2 monitors the received waveform and samples data from the monitored received waveform.

Histogram extracting circuit 3 integrates and averages the sampled data from waveform monitoring circuit 2 to extract histogram data representing an intensity distribution of the received waveform in a voltage direction.

As with amount-of-dispersion detector 4 according to the first exemplary embodiment shown in FIG. 4, amount-of-dispersion detector 28 comprises voltage-direction eye opening detector 5, lookup data table 6, and polarization dispersion estimating circuit 7. Amount-of-dispersion detector 28 additionally includes phase-direction eye opening detector 29, cross-point fluctuation detector 30, amount-of-fluctuation calculating circuit 31, and wavelength dispersion estimating circuit 32.

Voltage-direction eye opening detector 5 detects an eye opening size in the voltage direction (amplitude direction) of a received eye pattern waveform representative of the received waveform in the form of an eye pattern, which is obtained by analyzing the histogram data extracted by waveform monitor processor 1.

Phase-direction eye opening detector 29 detects an eye opening size in the phase direction (time-axis direction) of a received eye pattern waveform representative of the received waveform in the form of an eye pattern, which is obtained by analyzing the histogram data extracted by waveform monitor processor 1.

Cross-point fluctuation detector 30 detects an amount of fluctuation from a central position of the cross point (the point of intersection between a positive-going edge curve and a negative-going edge curve) of a received eye pattern waveform representative of the received waveform in the form of an eye pattern, which is obtained by analyzing the histogram data extracted by waveform monitor processor 1. The amount of fluctuation is calculated by amount-of-fluctuation calculating circuit 31 and thereafter input to polarization dispersion estimating circuit 7 and wavelength dispersion estimating circuit 32.

Lookup data table 6 stores, in advance, lookup data representative of the correlated relationship between amounts of polarization dispersion and extents of lateral asymmetry of the eye pattern waveform. Lookup data table 6 also stores, in advance, lookup data representative of the correlated relationship between amounts of wavelength dispersion and phase-direction eye opening sizes of the eye pattern waveform and the correlated relationship between amounts of wavelength dispersion and amounts of fluctuation of the cross point.

Figure 10:
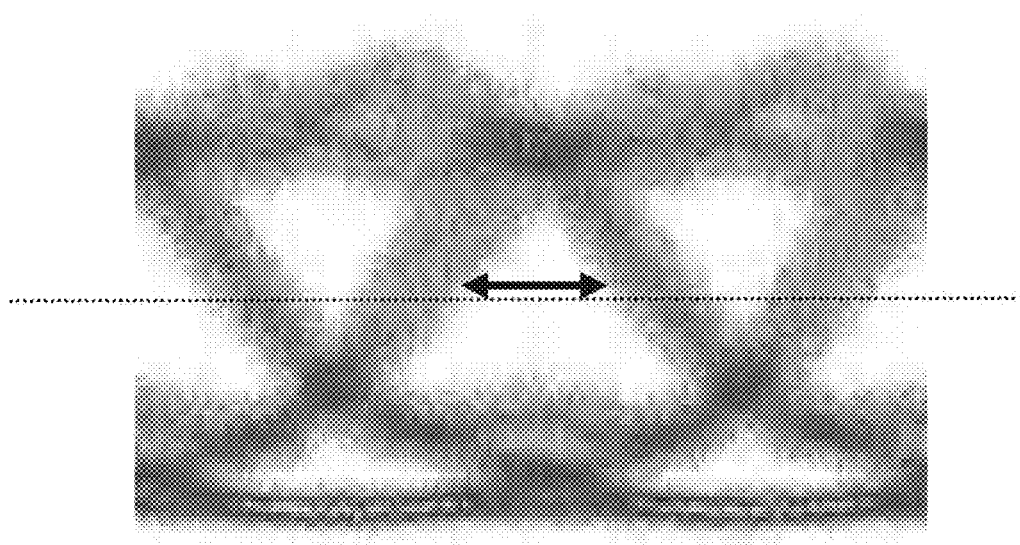
FIG. 10 is a diagram illustrative of the principles for estimating an amount of wavelength dispersion from a waveform which is degraded by wavelength dispersion.

As shown by an eye pattern waveform in FIG. 10, waveform degradations caused by wavelength dispersion are characterized in that the cross point fluctuates upwardly or downwardly from the central position and the margin in the phase direction of the eye pattern waveform is reduced, as opposed to the waveform degradations caused by polarization dispersion.

Wavelength dispersion estimating circuit 32 can uniquely estimate an amount of wavelength dispersion by comparing the eye opening size in the phase direction of the received eye pattern waveform which is detected by phase-direction eye opening detector 29 and the amount of fluctuation of the cross point of the received eye pattern waveform which is detected by cross-point fluctuation detector 30, with the lookup data in lookup data table 6.

Polarization dispersion estimating circuit 7 uniquely determines an amount of polarization dispersion by comparing a plurality of eye opening sizes in the voltage direction which are detected by voltage-direction eye opening detector 5 to determine an extent of lateral asymmetry of the received eye pattern waveform, and comparing the determined extent of lateral asymmetry with the lookup data in lookup data table 6.

According to the present exemplary embodiment, as described above, a single dispersion detecting apparatus can separately detect wavelength dispersion and polarization dispersion. The dispersion detecting apparatus can detect amounts of dispersion fast because it uses the lockup data stored in lookup data table 6.

According to the present exemplary embodiment, furthermore, the dispersion detecting apparatus detects an amount of wavelength dispersion based on the amount of fluctuation of the cross-point of the received eye pattern waveform and the eye opening size in the phase direction which represent a typical feature of wavelength dispersion, and also detects an amount of polarization dispersion based on the extent of lateral asymmetry of the received eye pattern waveform which represents a typical feature of polarization dispersion. According to the background art, an amount of polarization dispersion is estimated based on an associative map representing an association between waveform degradation patterns and causes of dispersion. Since accumulated data serving as a basis for the associative map may be fewer according to the present exemplary embodiment than according to the background art, the apparatus can be reduced in size according to the present exemplary embodiment. According to the present exemplary embodiment, furthermore, an amount of wavelength dispersion and an amount of polarization dispersion can be separately detected faster by simplifying the associative map.

Figure 11:
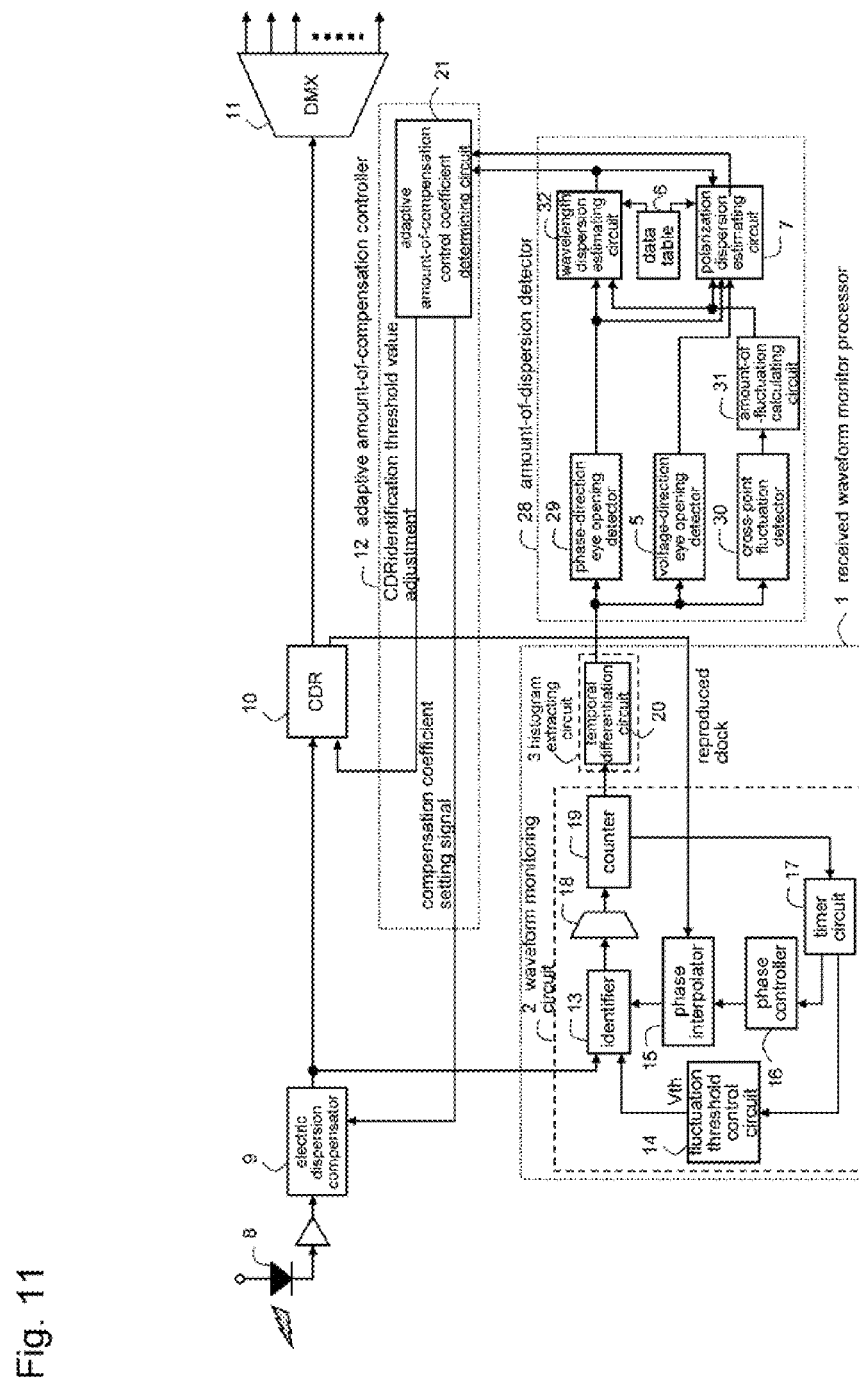
FIG. 11 is a diagram showing a configurational example of an automatic dispersion compensating system which employs the dispersion detecting apparatus shown in FIG. 9.

FIG. 11 is a diagram showing a configurational example of an automatic dispersion compensating system which employs the dispersion detecting apparatus shown in FIG. 9.

As shown in FIG. 11, the automatic dispersion compensating system according to the present exemplary comprises received waveform monitor processor 1 described above, amount-of-dispersion detector 28 described above, optoelectric transducer circuit 8, electric dispersion compensator 9, clock data recovery (CDR) circuit 10, series-to-parallel converting circuit (DMX) 11, and adaptive amount-of-compensation controller 12.

Optoelectric transducer circuit 8 converts a received signal transmitted through an optical fiber from an optical signal into an electric signal.

Electric dispersion compensator 9 compensates for a waveform degradation, caused by polarization dispersion and wavelength dispersion, of the received signal as converted into the electric signal by optoelectric transducer circuit 8.

Clock data recovery circuit 10 reproduces and extracts a clock signal, and recovers a data signal, from the signal that has passed through electric dispersion compensator 9.

Demultiplexer 11 converts the data signal which has been CDR-processed by clock data recovery circuit 10 from a series signal into a parallel signal.

Waveform monitoring circuit 2 comprises identifier 13, fluctuation threshold control circuit 14, phase interpolator 15, phase controller 16, timer circuit 17, series-to-parallel converting circuit 18, and counter 19.

Waveform monitoring circuit 2 samples data of the received waveform that has passed through electric dispersion compensator 9 while the identification threshold value of identifier 13 is being varied in the voltage direction by fluctuation threshold control circuit 14 and also while the phase of the identification block given to identifier 13 is being varied by phase interpolator 15 and phase controller 16. The sampled data produced by identifier 13 are converted from series data into parallel data by series-to-parallel converting circuit 18. Counter 19 counts the number of the sampled data. Timer circuit 17 controls the timing at which to vary the identification threshold value with fluctuation threshold control circuit 14 and also the timing at which to vary the phase with phase interpolator 15 and phase controller 16, depending on the count produced by counter 19.

Histogram extracting circuit 3 comprises temporal differentiation circuit 20 which integrates and averages the sampled data from waveform monitoring circuit 2 to extract histogram data.

In amount-of-dispersion detector 28, as described above, voltage-direction eye opening detector 5 detects an eye opening size in the voltage direction of the received eye pattern waveform which is produced by waveform monitor processor 1, phase-direction eye opening detector 29 detects an eye opening size in the phase direction, and cross-point fluctuation detector 30 detects an amount of fluctuation from the central position of the cross point of the received eye pattern waveform.

Wavelength dispersion estimating circuit 32 estimates an amount of wavelength dispersion by comparing the amount of fluctuation of the cross point of the received eye pattern waveform and the eye opening size in the phase direction with the lookup data in lookup data table 6.

Polarization dispersion estimating circuit 7 detects an amount of polarization dispersion by determining an extent of lateral asymmetry of the received eye pattern waveform and comparing the determined extent of lateral asymmetry with the lookup data in lookup data table 6.

Adaptive amount-of-compensation controller 12 includes adaptive amount-of-compensation control coefficient determining circuit 21 for determining an optimum compensation coefficient of electric dispersion compensator 9 and an optimum value of the identification threshold value of clock data recovery circuit 10 based on the amount of wavelength dispersion and the amount of polarization dispersion which are detected by amount-of-dispersion detector 28. For determining the optimum compensation coefficient and the identification threshold value, adaptive amount-of-compensation controller 12 may adopt, for example, a process of storing, in advance in a lookup data table, lookup data representative of the correlated relationship between amounts of wavelength dispersion and polarization dispersion and compensation coefficients and identification threshold values, and using the stored lookup data.

Figure 12:
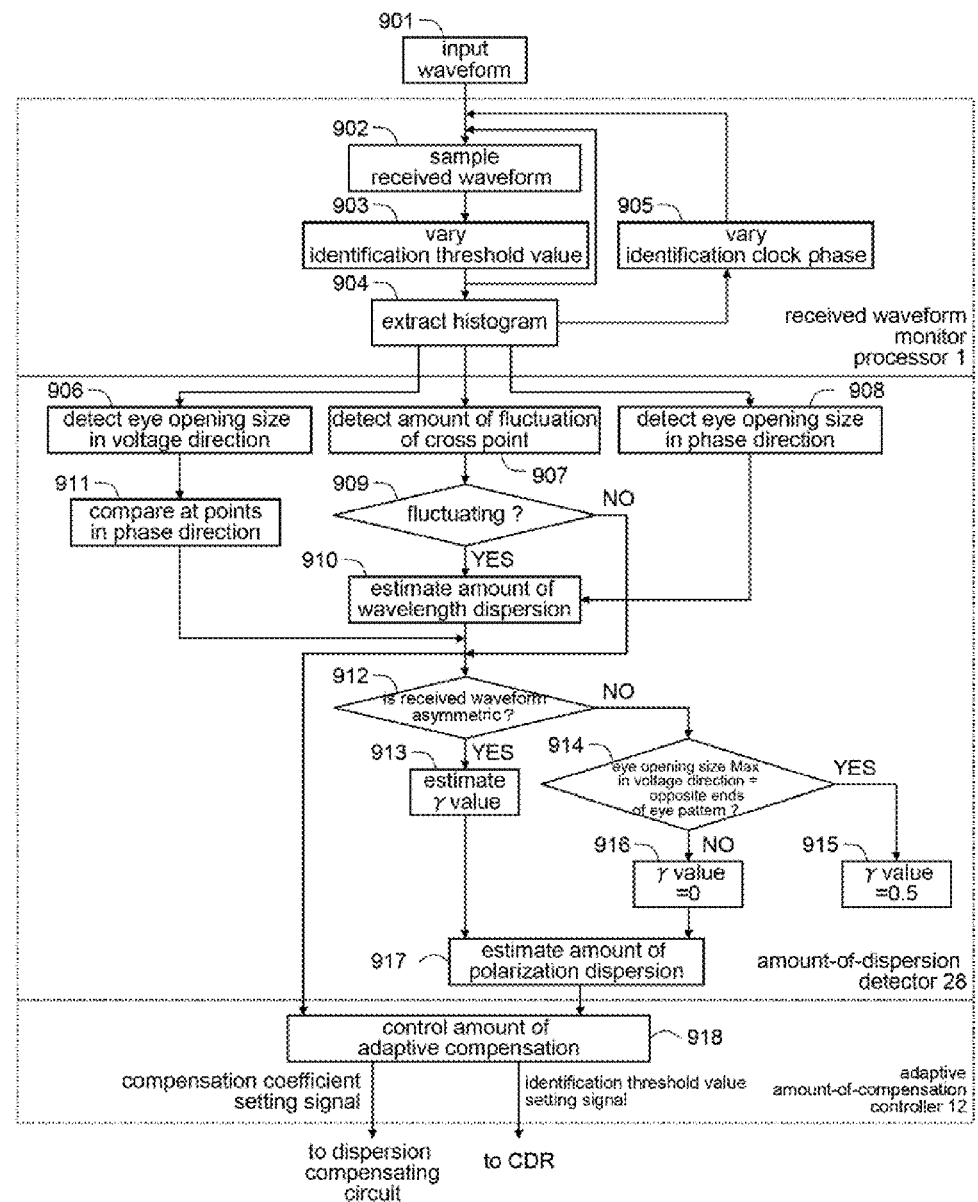
FIG. 12 is a flowchart of a general operating sequence of the automatic dispersion compensating system shown in FIG. 11.

FIG. 12 is a flowchart of a general operating sequence of the automatic dispersion compensating system shown in FIG. 11.

As shown in FIG. 12, received waveform monitor processor 1 is supplied with a received waveform from electric dispersion compensator 9 (step 901), samples the received waveform while varying the identification threshold value in the voltage direction (steps 902, 903), and extracts histogram data (step 904). Received waveform monitor processor 1 repeats steps 902 through 904 while varying the clock phase (step 905).

Then, amount-of-dispersion detector 28 detects an eye opening size in the voltage direction of the received eye pattern waveform which is obtained by analyzing the histogram data (step 906), detects an amount of fluctuation from the central position of the cross point of the received eye pattern waveform (step 907), and detects an eye opening size in the phase direction of the received eye pattern waveform (step 908). If the cross point fluctuates (step 909), then control goes to a routine for detecting an amount of wavelength dispersion. Amount-of-dispersion detector 28 detects an amount of wavelength dispersion by comparing the amount of fluctuation of the cross point and the eye opening sizes in the phase direction of the received eye pattern wavelength with the lookup data in lookup data table 6 (step 910). If the cross point does not fluctuate at all, then control goes to a routine for detecting an amount of polarization dispersion. In the routine for detecting an amount of polarization dispersion, an amount of polarization dispersion is detected in steps 911 through 917 which are identical to steps 407 through 413 illustrated in FIG. 7.

Thereafter, adaptive amount-of-compensation controller 12 determines an optimum compensation coefficient of electric dispersion compensator 9 and an optimum value of the identification threshold value of clock data recovery circuit 10 based on the amount of wavelength dispersion and the amount of polarization dispersion which are detected by amount-of-dispersion detector 4, and sets the determined values in electric dispersion compensator 9 and clock data recovery circuit 10 (step 918).

Figure 13:
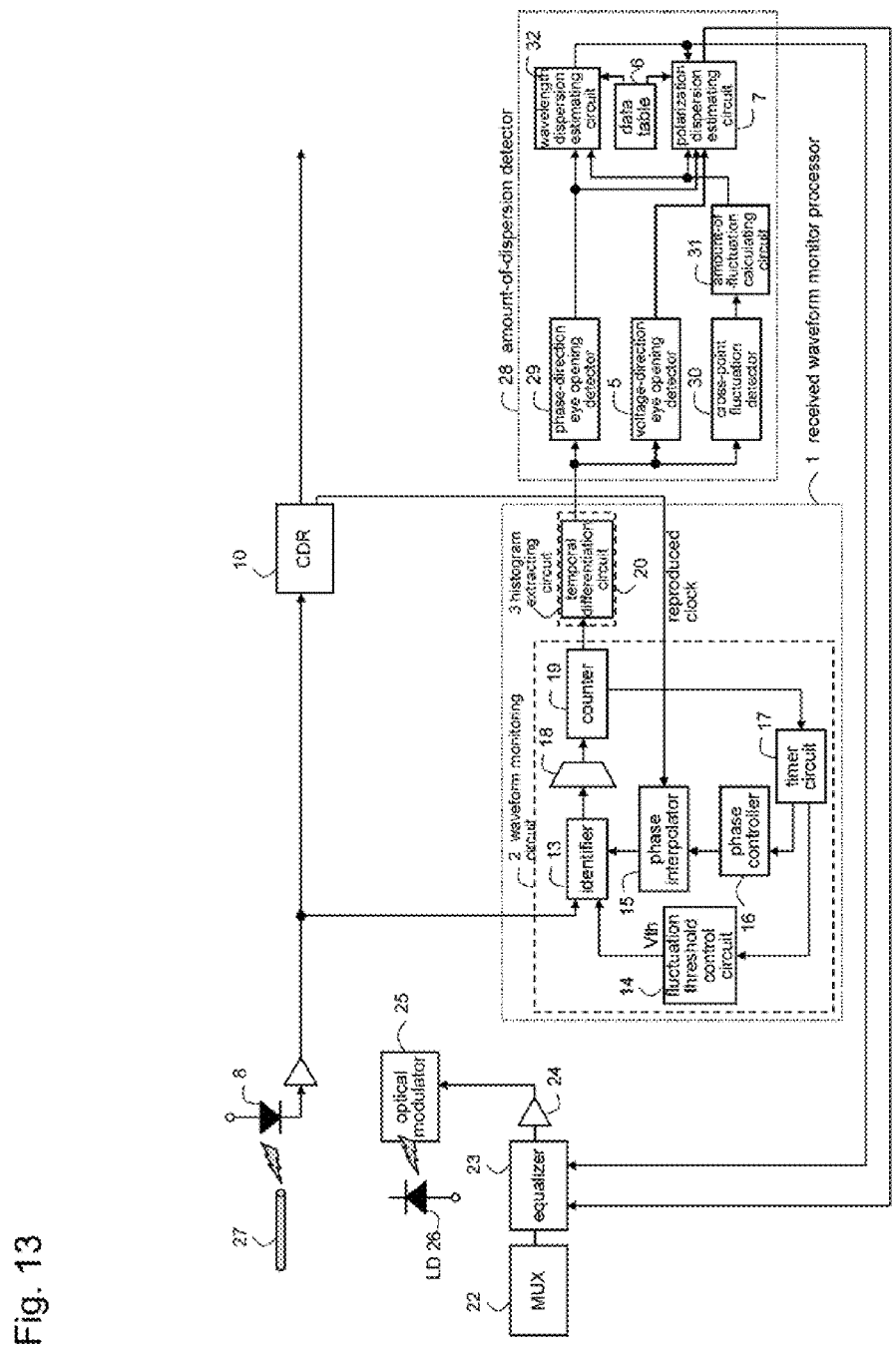
FIG. 13 is a diagram showing another configurational example of an automatic dispersion compensating system which employs the dispersion detecting apparatus shown in FIG. 9.

FIG. 13 is a diagram showing another configurational example of an automatic dispersion compensating system which employs the dispersion detecting apparatus shown in FIG. 9.

As shown in FIG. 13, the automatic dispersion compensating system according to the present example comprises a receiver including received waveform monitor processor 1 described above, amount-of-dispersion detector 28 described above, optoelectric transducer circuit 8, and clock data recovery circuit 10, and a transmitter including multiplexer (MUX) 22, electric equalizer circuit 23, optical modulator driver circuit 24, optical modulator 25, and laser diode 26.

Optoelectric transducer circuit 8 converts a received signal transmitted through optical fiber 27 from an optical signal into an electric signal.

Clock data recovery circuit 10 reproduces and extracts a clock signal, and recovers a data signal, from the received signal.

Received waveform monitor processor 1 monitors a received waveform received from optical fiber, and amount-of-dispersion detector 28 separately detects an amount of wavelength dispersion and an amount of polarization dispersion of the received waveform which is monitored by received waveform monitor processor 1. Configurational and operational details of received waveform monitor processor 1 and amount-of-dispersion detector 28 are identical to those shown in FIG. 11 and will not be described in detail below.

Multiplexer 22 converts a transmission signal to be transmitted to a transmission destination from a parallel signal into a series signal.

Electric equalizer circuit 23 corrects frequency characteristics of the transmission signal based on the amount of wavelength dispersion and the amount of polarization dispersion detected by amount-of-dispersion detector 28.

Optical modulator driver circuit 24 controls optical modulator 25 based on an output signal from electric equalizer circuit 23.

Optical modulator 25 modulates an optical signal emitted from laser diode 26 under the control of optical modulator driver circuit 24.

According to the present example, as described above, the amount of wavelength dispersion and the amount of polarization dispersion which are detected by the receiver are fed back to the transmitter, which transmits the transmission signal that has been dispersion-equalized in anticipation of the amount of degradation of the waveform, to a reception destination, for thereby optimizing an amount of compensation.

(3rd Exemplary Embodiment)

Figure 14:
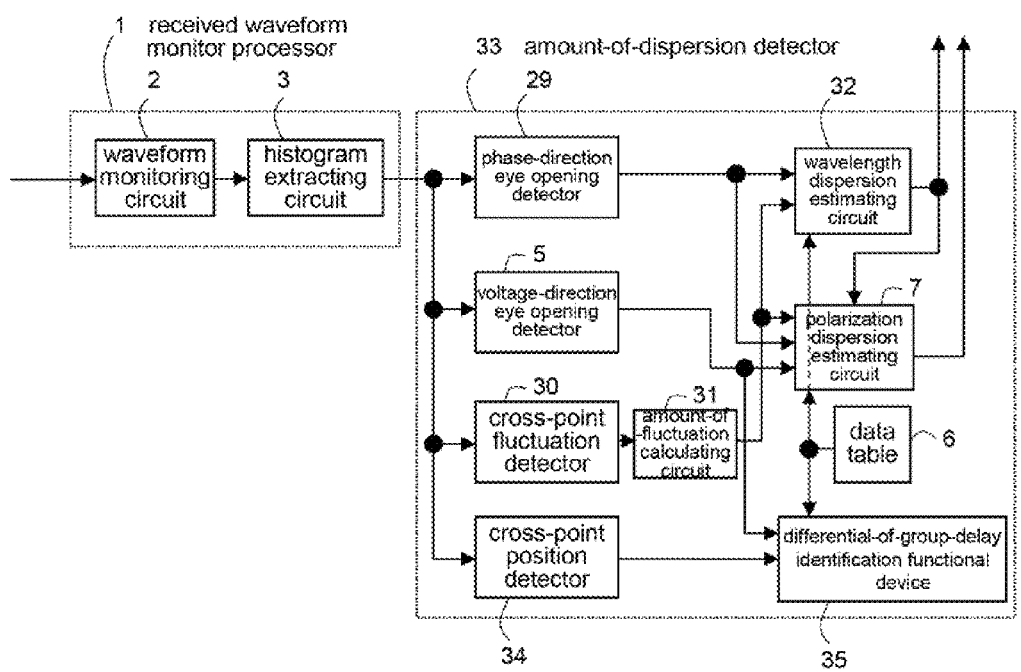
FIG. 14 is a block diagram showing the configuration of a dispersion detecting apparatus according to a third exemplary embodiment of the present invention.

FIG. 14 is a block diagram showing the configuration of a dispersion detecting apparatus according to a third exemplary embodiment of the present invention. The dispersion detecting apparatus according to the present exemplary embodiment detects an amount of wavelength dispersion and an amount of polarization dispersion in an optical fiber serving as a transmission path, and also detects when a differential group delay (DGD) of polarization dispersion is equal to or greater than one unit interval of a received eye pattern waveform.

As shown in FIG. 14, the dispersion detecting apparatus according to the present exemplary embodiment comprises received waveform monitor processor 1 for monitoring a received waveform which is degraded of a received signal that is received from an optical fiber, and amount-of-dispersion detector 33 for separately detecting an amount of wavelength dispersion and an amount of polarization dispersion of the received waveform which is monitored by received waveform monitor processor 1, and detecting when a differential group delay of polarization dispersion is equal to or greater than one unit interval of a received eye pattern waveform.

Waveform monitor processor 1 comprises waveform monitoring circuit 2 and histogram extracting circuit 3.

Waveform monitoring circuit 2 monitors the received waveform and samples data from the monitored received waveform.

Histogram extracting circuit 3 integrates and averages the sampled data from waveform monitoring circuit 2 to extract histogram data representing an intensity distribution of the received waveform in a voltage direction.

As with amount-of-dispersion detector 28 according to the second exemplary embodiment shown in FIG. 9, amount-of-dispersion detector 33 comprises voltage-direction eye opening detector 5, lookup data table 6, polarization dispersion estimating circuit 7, phase-direction eye opening detector 29, cross-point fluctuation detector 30, amount-of-fluctuation calculating circuit 31, and wavelength dispersion estimating circuit 32. Amount-of-dispersion detector 33 comprises cross-point position detector 34 and amount-of-group-delay identification functional device 35.

Voltage-direction eye opening detector 5 detects an eye opening size in the voltage direction (amplitude direction) of a received eye pattern waveform representative of the received waveform in the form of an eye pattern, which is obtained by analyzing the histogram data extracted by waveform monitor processor 1. Information representative of the eye opening size in the voltage direction is input to polarization dispersion estimating circuit 7 and amount-of-group-delay identification functional device 35.

Phase-direction eye opening detector 29 detects an eye opening size in the phase direction (time-axis direction) of a received eye pattern waveform representative of the received waveform in the form of an eye pattern, which is obtained by analyzing the histogram data extracted by waveform monitor processor 1.

Cross-point fluctuation detector 30 detects an amount of fluctuation from a central position of the cross point (the point of intersection between a positive-going edge curve and a negative-going edge curve) of a received eye pattern waveform representative of the received waveform in the form of an eye pattern, which is obtained by analyzing the histogram data extracted by waveform monitor processor 1. The amount of fluctuation is calculated by amount-of-fluctuation calculating circuit 31 and thereafter input to polarization dispersion estimating circuit 7 and wavelength dispersion estimating circuit 32.

Cross-point position detector 34 detects a position near an intermediate potential between a high level side (mark side) and a low level side (space side) of a cross point of the received eye pattern waveform which is obtained by analyzing the histogram data extracted by waveform monitor processor 1.

Lookup data table 6 stores, in advance, lookup data representative of the correlated relationship between amounts of polarization dispersion and extents of lateral asymmetry of the eye pattern waveform. Lookup data table 6 also stores, in advance, lookup data representative of the correlated relationship between amounts of wavelength dispersion and phase-direction eye opening sizes of the eye pattern waveform and the correlated relationship between amounts of wavelength dispersion and amounts of fluctuation of the cross point. Furthermore, lookup data table 6 stores, in advance, lookup data representative of the correlated relationship between amounts of polarization dispersion in the case where the differential group delay is equal to or greater than one unit interval, data as to whether the cross point is present in the time of one unit interval of the eye pattern waveform or not, and eye opening sizes in the voltage direction.

Figure 15:
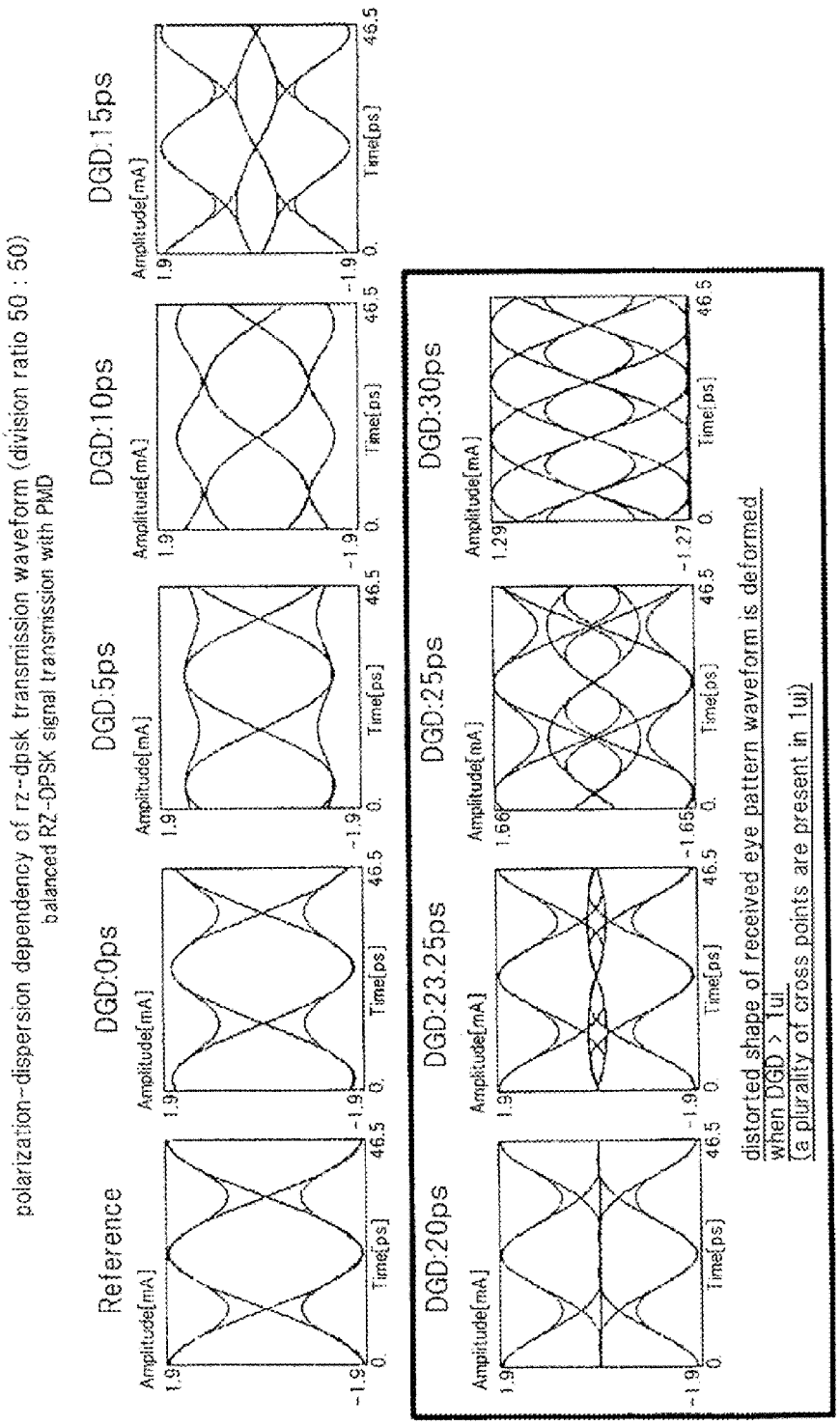
FIG. 15 is a diagram showing the simulated differences between degradation levels due to different amounts of differential group delay of received eye pattern waveforms.

FIG. 15 is a diagram showing the simulated differences between degradation levels due to different amounts of differential group delay of received eye pattern waveforms.

As shown in FIG. 15, of waveform degradations caused by polarization dispersion, waveform degradations whose differential group delay is equal to or greater than one unit interval time of a received eye pattern waveform are mainly characterized in that they have a degraded shape wherein the position of a cross point near an intermediate potential between a high level side and a low level side of the received eye pattern waveform is present also within one unit interval of the eye pattern waveform.

If amount-of-group-delay identification functional device 35 identifies the existence of a cross point in the eye opening of the received eye pattern waveform (within one unit interval) based on the detected result from cross-point position detector 34, then amount-of-group-delay identification functional device 35 compares the eye opening size in the voltage direction with the lookup data in lookup data table 6 to identify that the differential group delay is equal to or greater than one unit interval time. Conversely, if amount-of-group-delay identification functional device 35 does not identify the existence of a cross point within one unit interval, then amount-of-group-delay identification functional device 35 identifies that the differential group delay is smaller than one unit interval time.

If waveform degradations caused by wavelength dispersion are present, then since the cross point fluctuates upwardly or downwardly from the central position and the margin in the phase direction of the eye pattern waveform is reduced as described in the second exemplary embodiment, wavelength dispersion estimating circuit 32 can uniquely estimate an amount of wavelength dispersion by comparing the eye opening size in the phase direction of the received eye pattern waveform which is detected by phase-direction eye opening detector 29 and the amount of fluctuation of the cross point of the received eye pattern waveform which is detected by cross-point fluctuation detector 30, with the lookup data in lookup data table 6.

As also described in the second exemplary embodiment, polarization dispersion estimating circuit 7 uniquely determines an amount of polarization dispersion by comparing a plurality of eye opening sizes in the voltage direction which are detected by voltage-direction eye opening detector 5 to determine an extent of lateral asymmetry of the received eye pattern waveform, and comparing the determined extent of lateral asymmetry with the lookup data in lookup data table 6.

According to the present exemplary embodiment, as described above, a single dispersion detecting apparatus can separately detect wavelength dispersion and polarization dispersion, and can also detect when the differential group delay of polarization dispersion is equal to or greater than one unit interval time of a received eye pattern waveform. The dispersion detecting apparatus can detect them fast because it uses the lookup data that are stored in advance in lookup data table 6.

According to the present exemplary embodiment, furthermore, an amount of wavelength dispersion is detected based on the amount of fluctuation of the cross-point of the received eye pattern waveform and the eye opening size in the phase direction which represent a typical feature of wavelength dispersion, and an amount of polarization dispersion is detected based on the extent of lateral asymmetry of the received eye pattern waveform which represents a typical feature of polarization dispersion. The differential group delay of the received eye pattern waveform which is equal to or greater than one unit interval time is identified based on the information as to whether the cross point is present in the received eye pattern waveform or not. According to the background art, an amount of polarization dispersion is estimated based on an associative map representing an association between waveform degradation patterns and causes of dispersion. Since accumulated data serving as a basis for the associative map may be fewer according to the present exemplary embodiment than according to the background art, the apparatus can be reduced in size according to the present exemplary embodiment. According to the present exemplary embodiment, furthermore, an amount of wavelength dispersion and an amount of polarization dispersion can be separately detected faster by simplifying the associative map.

Figure 16:
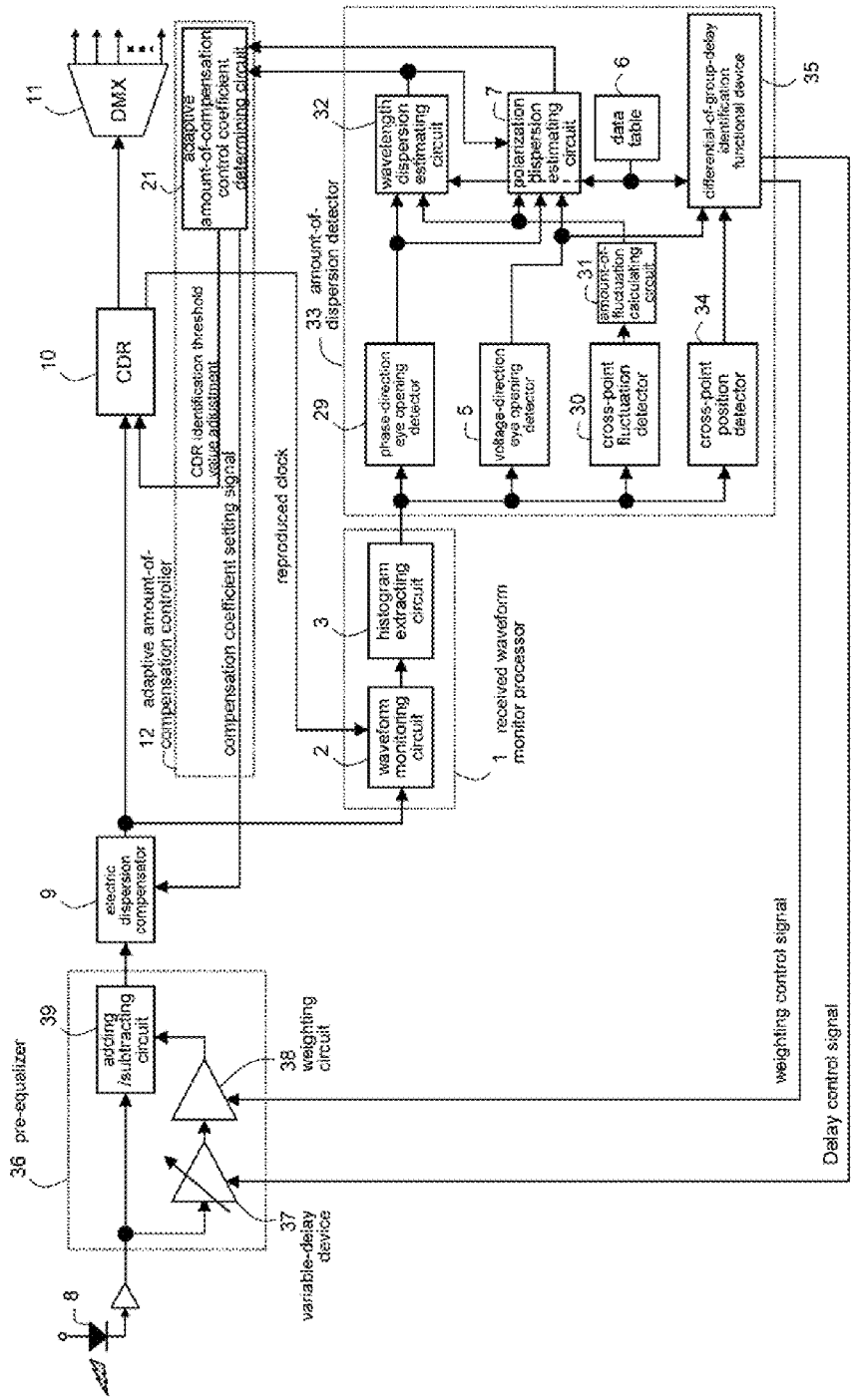
FIG. 16 is a diagram showing a configurational example of an automatic dispersion compensating system which employs the dispersion detecting apparatus shown in FIG. 14.

FIG. 16 is a diagram showing a configurational example of an automatic dispersion compensating system which employs the dispersion detecting apparatus shown in FIG. 14.

As shown in FIG. 16, the automatic dispersion compensating system according to the present exemplary comprises received waveform monitor processor 1 described above, amount-of-dispersion detector 33 described above, optoelectric transducer circuit 8, electric dispersion compensator 9, clock data recovery (CDR) circuit 10, series-to-parallel converting circuit (DMX) 11, adaptive amount-of-compensation controller 12, and pre-equalizer 36.

Pre-equalizer 36 is disposed between optoelectric transducer circuit 8 and electric dispersion compensator 9. Pre-equalizer 36 comprises variable-delay device 37, weighting circuit 38, and adding/subtracting circuit 39. However, pre-equalizer 36 may comprise a general filter circuit such as a transversal filter.

Optoelectric transducer circuit 8 converts a received signal transmitted through an optical fiber from an optical signal into an electric signal.

Electric dispersion compensator 9 compensates for a waveform degradation, caused by polarization dispersion and wavelength dispersion, of the received signal as converted into the electric signal by optoelectric transducer circuit 8.

Clock data recovery circuit 10 reproduces and extracts a clock signal, and recovers a data signal, from the signal that has passed through electric dispersion compensator 9.

Demultiplexer 11 converts the data signal which has been CDR-processed by clock data recovery circuit 10 from a series signal into a parallel signal.

In amount-of-dispersion detector 33, as described above, voltage-direction eye opening detector 5 detects an eye opening size in the voltage direction of a received eye pattern waveform which is obtained by analyzing the histogram data extracted by waveform monitor processor 1, phase-direction eye opening detector 29 detects an eye opening size in the phase direction of the received eye pattern waveform, and cross-point fluctuation detector 30 detects an amount of fluctuation from a central position of the cross point of the received eye pattern waveform. Cross-point position detector 34 detects a position near an intermediate potential of the cross point of the received eye pattern waveform.

Wavelength dispersion estimating circuit 32 estimates an amount of wavelength dispersion by comparing the amount of fluctuation of the cross point and the eye opening size in the phase direction of the received eye pattern waveform with the lookup data in lookup data table 6.

Polarization dispersion estimating circuit 7 detects an amount of polarization dispersion by determining an extent of lateral asymmetry of the received eye pattern waveform and comparing the determined extent of lateral asymmetry with the lookup data in lookup data table 6.

If amount-of-group-delay identification functional device 35 identifies the existence of a cross point within one unit interval time of the received eye pattern waveform, then amount-of-group-delay identification functional device 35 compares the eye opening size in the voltage direction with the lookup data in lookup data table 6 to identify that the differential group delay is equal to or greater than one unit interval time. Conversely, if amount-of-group-delay identification functional device 35 does not identify the existence of a cross point within one unit interval of the received eye pattern waveform, then amount-of-group-delay identification functional device 35 identifies that the differential group delay is smaller than one unit interval time.

If amount-of-group-delay identification functional device 35 identifies that the differential group delay is equal to or greater than one unit interval time, then amount-of-group-delay identification functional device 35 outputs a control signal to pre-equalizer 36 to set its operating state for compensating for a waveform degradation due to a differential group delay which corresponds to the first one unit interval time of the received waveform. The remaining waveform degradation is compensated for by a waveform shaping process performed by electric dispersion compensator 9 in the next stage.

In the present exemplary embodiment, a delay control signal is output to variable-delay device 37, and a weighting control signal is output to weighting circuit 38. Based on the delay control signal, variable-delay device 37 delays the received signal as converted into the electric signal by optoelectric transducer circuit 8. Based on the weighting control signal, weighting circuit 38 weights the received signal output from variable-delay device 37. Adding/subtracting circuit 39 adds and subtracts the received signal to be input to variable-delay device 37 and the received signal output from weighting circuit 38. In this manner, the waveform degradation only for the first one unit interval time of the received waveform can be equalized.

Adaptive amount-of-compensation controller 12 includes adaptive amount-of-compensation control coefficient determining circuit 21 for determining an optimum compensation coefficient of electric dispersion compensator 9 and an optimum value of the identification threshold value of clock data recovery circuit 10 based on the amount of wavelength dispersion and the amount of polarization dispersion which are detected by amount-of-dispersion detector 33. For determining the optimum compensation coefficient and the identification threshold value, adaptive amount-of-compensation controller 12 may adopt, for example, a process of storing, in advance in a lookup data table, lookup data representative of the correlated relationship between amounts of wavelength dispersion and amounts of polarization dispersion and compensation coefficients and identification threshold values, and using the stored lookup data.

Figure 17:
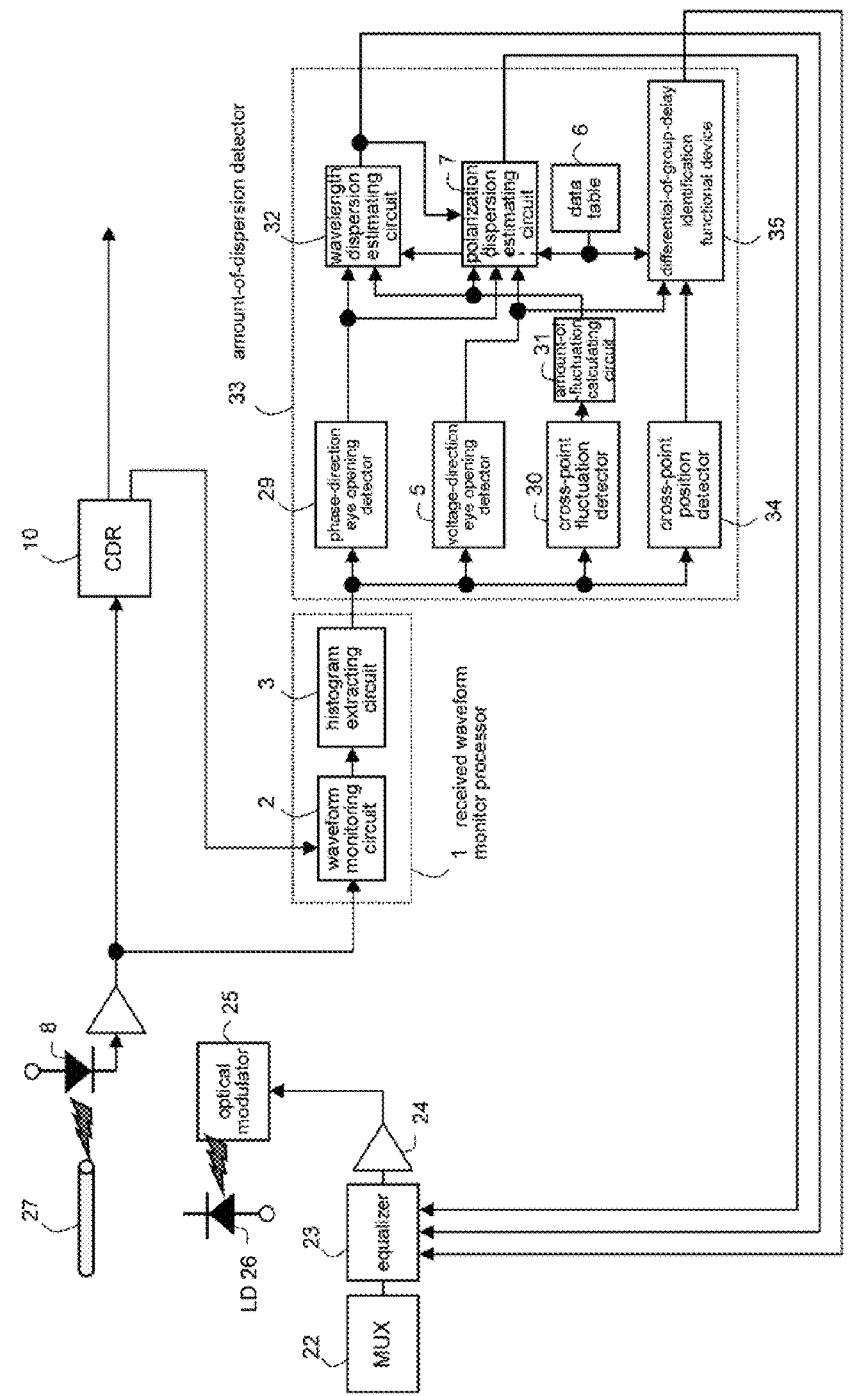
FIG. 17 is a diagram showing another configurational example of an automatic dispersion compensating system which employs the dispersion detecting apparatus shown in FIG. 14.

FIG. 17 is a diagram showing another configurational example of an automatic dispersion compensating system which employs the dispersion detecting apparatus shown in FIG. 14.

As shown in FIG. 17, the automatic dispersion compensating system according to the present example comprises a receiver including received waveform monitor processor 1 described above, amount-of-dispersion detector 33 described above, optoelectric transducer circuit 8, and clock data recovery circuit 10, and a transmitter including multiplexer (MUX) 22, electric equalizer circuit 23, optical modulator driver circuit 24, optical modulator 25, and laser diode 26.

Optoelectric transducer circuit 8 converts a received signal transmitted through optical fiber 27 from an optical signal into an electric signal.

Clock data recovery circuit 10 reproduces and extracts a clock signal, and recovers a data signal, from the received signal.

Received waveform monitor processor 1 monitors a received waveform received from optical fiber, and amount-of-dispersion detector 33 detects an amount of wavelength dispersion and an amount of polarization dispersion of the received waveform which is monitored by received waveform monitor processor 1. Amount-of-dispersion detector 33 also detects when the differential group delay of polarization dispersion is equal to or greater than one unit interval time, i.e., when the waveform degradation due to polarization dispersion is of an extremely degraded configuration. Configurational and operational details of amount-of-dispersion detector 33 are identical to those shown in FIG. 14 and will not be described in detail below.

Multiplexer 22 converts a transmission signal to be transmitted to a transmission destination from a parallel signal into a series signal.

Electric equalizer circuit 23 corrects frequency characteristics of the transmission signal based on the amount of wavelength dispersion, the amount of polarization dispersion, and whether the differential group delay is equal to or greater than one unit interval or not, which are detected by amount-of-dispersion detector 33.

Optical modulator driver circuit 24 controls optical modulator 25 based on an output signal from electric equalizer circuit 23.

Optical modulator 25 modulates an optical signal emitted from laser diode 26 under the control of optical modulator driver circuit 24.

According to the present example, as described above, the amount of wavelength, dispersion, the amount of polarization dispersion, and the generated differential group delay which are detected by the receiver are fed back to the transmitter, which transmits the transmission signal that has been dispersion-equalized in anticipation of the amount of degradation of the waveform, to a reception destination, for thereby optimizing an amount of compensation.

The present application is the National Phase of PCT/JP2007/065900, filed Aug. 15, 2007, which claims priority based on Japanese patent application No. 2006-323966 filed on Nov. 30, 2006 and Japanese patent application No. 2007-193295 filed on Jul. 25, 2007, and incorporates all the disclosure by way of reference herein.

The invention claimed is:

1. A dispersion detecting apparatus comprising:
a received waveform monitor processor including a waveform monitoring circuit for sampling data from the received waveform of a received signal transmitted through a transmission path, and a histogram extracting circuit for extracting histogram data representing an intensity distribution of said received waveform in a voltage direction based on the sampled data from said waveform monitoring circuit; and
an amount-of-dispersion detector including a polarization dispersion estimating circuit for determining an extent of lateral symmetry of a received eye pattern waveform of said received waveform which is produced by analyzing the histogram data extracted by said received waveform monitor processor, and estimating an amount of polarization dispersion in said transmission path based on the determined extent of lateral symmetry, wherein said waveform monitoring circuit comprises:
an identifier for sampling data higher than an identification threshold value in a voltage direction set from an external circuit, from said received waveform at a timing based on an identification clock input from an external circuit;
means for setting the identification threshold value of said identifier; and
means for changing the phase of the identification clock input to said identifier;
wherein said identifier repeatedly samples a plurality of data from said received waveform while the identification threshold value of said identifier is being varied in the voltage direction and the phase of the identification clock input to said identifier is being varied.

2. The dispersion detecting apparatus according to claim 1, wherein said histogram extracting circuit calculates the difference between an integrated value of sampled data which have been produced by sampling the received waveform for a fixed period of time while said identification threshold value is being fixed, and an integrated value of sampled data which have been produced by sampling the received waveform for a fixed period of time while said identification threshold value is subsequently varied one step, and accumulates differential data each time the identification threshold value is varied, thereby to calculate an intensity distribution in the voltage direction of said received waveform, as said histogram data.

3. The dispersion detecting apparatus according to claim 1, wherein said amount-of-dispersion detector further includes:
a voltage-direction eye opening detector for detecting an eye opening size in the voltage direction of the received eye pattern waveform based on the histogram data extracted by said received waveform monitor processor; and
said polarization dispersion estimating circuit acquires the detected eye opening size in the voltage direction of said received eye pattern waveform each time the phase of said identification clock is varied, compares the detected eye opening size to determine an extent of lateral asymmetry of said received eye pattern waveform, and estimates said amount of polarization dispersion based on the determined extent of lateral asymmetry.

4. The dispersion detecting apparatus according to claim 1, wherein said amount-of-dispersion detector further includes:
a lookup data table storing in advance therein lookup data representative of the correlated relationship between amounts of polarization dispersion and extents of lateral asymmetry of the eye pattern waveform; and
said polarization dispersion estimating circuit estimates said amount of polarization dispersion by comparing the determined extent of lateral symmetry of said received eye pattern waveform with the lookup data in said lookup data table.

5. The dispersion detecting apparatus according to claim 1, wherein said amount-of-dispersion detector further includes:
a wavelength dispersion estimating circuit for estimating an amount of wavelength dispersion in said transmission path based on an amount of fluctuation from a central position of a cross point and an eye opening size in a phase direction of said received eye pattern waveform.

6. The dispersion detecting apparatus according to claim 5, wherein said waveform monitoring circuit comprises:
an identifier for sampling data higher than an identification threshold value in a voltage direction set from an external circuit, from said received waveform at a timing based on an identification clock input from an external circuit;
means for setting the identification threshold value of said identifier; and
means for changing the phase of the identification clock input to said identifier;
wherein said identifier repeatedly samples a plurality of data from said received waveform while the identification threshold value of said identifier is being varied in the voltage direction and the phase of the identification clock input to said identifier is being varied.

7. The dispersion detecting apparatus according to claim 6, wherein said histogram extracting circuit calculates the difference between an integrated value of sampled data which have been produced by sampling the received waveform for a fixed period of time while said identification threshold value is being fixed, and an integrated value of sampled data which have been produced by sampling the received waveform for a fixed period of time while said identification threshold value is subsequently varied one step, and accumulates differential data each time the identification threshold value is varied, thereby to calculate an intensity distribution in the voltage direction of said received waveform, as said histogram data.

8. The dispersion detecting apparatus according to claim 6, wherein said amount-of-dispersion detector further includes:
a voltage-direction eye opening detector for detecting an eye opening size in the voltage direction of the received eye pattern waveform; and
said polarization dispersion estimating circuit acquires the detected eye opening size in the voltage direction of said received eye pattern waveform each time the phase of said identification clock is varied, compares the detected eye opening size to determine an extent of lateral asymmetry of said received eye pattern waveform, and estimates said amount of polarization dispersion based on the determined extent of lateral asymmetry.

9. The dispersion detecting apparatus according to claim 5, wherein said amount-of-dispersion detector further includes:
a cross-point fluctuation detector for detecting an amount of fluctuation from a central position of a cross point of said received eye pattern waveform; and
a phase-direction eye opening detector for detecting an eye opening size in the phase direction of the received eye pattern waveform based on the histogram data extracted by said received waveform monitor processor; and
said polarization dispersion estimating circuit acquires the detected amount of fluctuation from the central position of the cross point and the detected eye opening size in the phase direction of said received eye pattern waveform, and estimates said amount of wavelength dispersion based on the detected amount of fluctuation and the detected eye opening size.

10. The dispersion detecting apparatus according to claim 5, wherein said amount-of-dispersion detector further includes:
a lookup data table storing in advance therein lookup data representative of the correlated relationship between amounts of polarization dispersion and extents of lateral asymmetry of the eye pattern waveform, and lookup data representative of the correlated relationship between amounts of wavelength dispersion, eye opening sizes in the phase direction and fluctuations of the cross point of the eye pattern waveform;

said polarization dispersion estimating circuit estimates said amount of polarization dispersion by comparing the determined extent of lateral symmetry of said received eye pattern waveform with the lookup data in said lookup data table; and said wavelength dispersion estimating circuit estimates said amount of wavelength dispersion by comparing the amount of fluctuation from the central position of the cross point and the eye opening size in the phase direction of said received eye pattern waveform with the lookup data in said lookup data table.

11. The dispersion detecting apparatus according to claim 5, wherein said amount-of-dispersion detector further includes:

an amount-of-group-delay identification functional device for identifying that a differential group delay of polarization dispersion is equal to or greater than one unit interval time of said received eye pattern waveform based on the position of the cross point near an intermediate potential between high and low level sides of said received eye pattern waveform and an eye opening size in the voltage direction of said received eye pattern waveform.

12. The dispersion detecting apparatus according to claim 11, wherein said waveform monitoring circuit comprises:

an identifier for sampling data higher than an identification threshold value in a voltage direction set from an external circuit, from said received waveform at a timing based on an identification clock input from an external circuit;

means for setting the identification threshold value of said identifier; and means for changing the phase of the identification clock input to said identifier;

wherein said identifier repeatedly samples a plurality of data from said received waveform while the identification threshold value of said identifier is being varied in the voltage direction and the phase of the identification clock input to said identifier is being varied.

13. The dispersion detecting apparatus according to claim 12, wherein said histogram extracting circuit calculates the difference between an integrated value of sampled data which have been produced by sampling the received waveform for a fixed period of time while said identification threshold value is being fixed, and an integrated value of sampled data which have been produced by sampling the received waveform for a fixed period of time while said identification threshold value is subsequently varied one step, and accumulates differential data each time the identification threshold value is varied, thereby to calculate an intensity distribution in the voltage direction of said received waveform, as said histogram data.

14. The dispersion detecting apparatus according to claim 12, wherein said amount-of-dispersion detector further includes:

a voltage-direction eye opening detector for detecting an eye opening size in the voltage direction of the received eye pattern waveform; and said polarization dispersion estimating circuit acquires the detected eye opening size in the voltage direction of said received eye pattern waveform each time the phase of said identification clock is varied, compares the detected eye opening size to determine an extent of lateral asymmetry of said received eye pattern waveform, and estimates said amount of polarization dispersion based on the determined extent of lateral asymmetry.

15. The dispersion detecting apparatus according to claim 11, wherein said amount-of-dispersion detector further includes:

a cross-point fluctuation detector for detecting an amount of fluctuation from a central position of a cross point of said received eye pattern waveform; and a phase-direction eye opening detector for detecting an eye opening size in the phase direction of the received eye pattern waveform based on the histogram data extracted by said received waveform monitor processor; and said polarization dispersion estimating circuit acquires the detected amount of fluctuation from the central position of the cross point and the detected eye opening size in the phase direction of said received eye pattern waveform, and estimates said amount of wavelength dispersion based on the detected amount of fluctuation and the detected eye opening size.

16. The dispersion detecting apparatus according to claim 11, wherein said amount-of-dispersion detector further includes:

a voltage-direction eye opening detector for detecting an eye opening size in the voltage direction of the received eye pattern waveform; and a cross-point position detector for detecting the position of the cross point near the intermediate potential between the high and low level sides of said received eye pattern waveform; and if the cross point is present in an eye opening of said received eye pattern waveform, said amount-of-group-delay identification functional device identifies that the differential group delay of polarization dispersion is equal to or greater than one unit interval time of said received eye pattern waveform, based on the eye opening size in the voltage direction at the time.

17. The dispersion detecting apparatus according to claim 11, wherein said amount-of-dispersion detector further includes:

a lookup data table storing in advance therein lookup data representative of the correlated relationship between amounts of polarization dispersion and extents of lateral asymmetry of the eye pattern waveform, lookup data representative of the correlated relationship between amounts of wavelength dispersion, eye opening sizes in the phase direction and fluctuations of the cross point of the eye pattern waveform, and lookup data representative of the correlated relationship between amounts of polarization dispersion if a differential group delay is equal to or greater than one unit interval, whether the cross point is present within one unit interval time of the eye pattern or not, and eye opening sizes in the voltage direction at the time;

said polarization dispersion estimating circuit estimates said amount of polarization dispersion by comparing the determined extent of lateral symmetry of said received eye pattern waveform with the lookup data in said lookup data table;

said wavelength dispersion estimating circuit estimates said amount of wavelength dispersion by comparing the amount of fluctuation from the central position of the cross point and the eye opening size in the phase direction of said received eye pattern waveform with the lookup data in said lookup data table; and if the cross point is present in an eye opening of said received eye pattern waveform, said amount-of-group-delay identification functional device identifies that said differential group delay is equal to or greater than one unit interval time of said received eye pattern waveform by comparing based on the eye opening size in the voltage direction at the time with the lookup data in said lookup data table.

18. An automatic dispersion compensating system comprising:
a dispersion detecting apparatus according to claim 11;
an optoelectric transducer circuit for converting a received signal transmitted through said transmission path from an optical signal into an electric signal;
an electric dispersion compensator for compensating for a waveform degradation, caused by polarization dispersion, of the received signal as converted into the electric signal by said optoelectric transducer circuit;
a clock data recovery circuit for reproducing and extracting a clock signal, and recovering a data signal, from the signal that has passed through said electric dispersion compensator;
a demultiplexer for converting the data signal output from said clock data recovery circuit from a series signal into a parallel signal;
an adaptive amount-of-compensation controller for controlling a compensation coefficient of said electric dispersion compensator and an identification threshold value of said clock data recovery circuit based on the amount of polarization dispersion and the amount of wavelength dispersion which are detected by said dispersion detecting apparatus; and
a pre-equalizer disposed between said optoelectric transducer circuit and said electric dispersion compensator, for compensating for a waveform degradation due to a differential group delay which corresponds to a first one unit interval time of the received signal if said dispersion detecting apparatus identifies that said differential group delay is equal to or greater than one unit interval time of said received eye pattern waveform;
wherein after said dispersion detecting apparatus has detected said amount of polarization dispersion and said amount of wavelength dispersion based on a received waveform of the received signal that has passed through said electric dispersion compensator, if said differential group delay is identified as being equal to or grater than the one unit interval time, said pre-equalizer is initially energized to equalize the waveform degradation due to the differential group delay which corresponds to the one unit interval time, and thereafter said adaptive amount-of-compensation controller automatically controls an optimum compensation coefficient to be used by said electric dispersion compensator and the identification threshold value of said clock data recovery circuit; and
after said dispersion detecting apparatus has detected said amount of polarization dispersion and said amount of wavelength dispersion based on the received waveform of the received signal that has passed through said electric dispersion compensator, if said differential group delay is identified as being smaller than the one unit interval time, said pre-equalizer is not energized, and said adaptive amount-of-compensation controller automatically controls an optimum compensation coefficient to be used by said electric dispersion compensator and the identification threshold value of said clock data recovery circuit.

19. The automatic dispersion compensating system according to claim 18, wherein said pre-equalizer comprises:
a delay device for delaying the received signal as converted into the electric signal by said optoelectric transducer circuit under the control of said dispersion detecting apparatus;
a weighting circuit for weighting the received signal output from said delay device under the control of said dispersion detecting apparatus; and
an adding/subtracting for adding and subtracting the received signal to be input to said delay device and the received signal output from said weighting circuit.

20. An automatic dispersion compensating system comprising:
a receiver including a dispersion detecting apparatus according to claim 11; and
a transmitter for dispersion-equalizing an optical signal serving as a transmission signal based on the detected amount of polarization dispersion fed back from said dispersion detecting apparatus and whether or not the differential group delay is equal to or grater than the one unit interval time, and thereafter transmitting the optical signal.

21. An automatic dispersion compensating system comprising:
a dispersion detecting apparatus according to claim 5;
an optoelectric transducer circuit for converting a received signal transmitted through said transmission path from an optical signal into an electric signal;
an electric dispersion compensator for compensating for a waveform degradation, caused by polarization dispersion and wavelength dispersion, of the received signal as converted into the electric signal by said optoelectric transducer circuit;
a clock data recovery circuit for reproducing and extracting a clock signal, and recovering a data signal, from the signal that has passed through said electric dispersion compensator;
a demultiplexer for converting the data signal output from said clock data recovery circuit from a series signal into a parallel signal; and
an adaptive amount-of-compensation controller for controlling a compensation coefficient of said electric dispersion compensator and an identification threshold value of said clock data recovery circuit based on the amount of polarization dispersion and the amount of wavelength dispersion which are detected by said dispersion detecting apparatus;
wherein after said dispersion detecting apparatus has detected said amount of polarization dispersion and said amount of wavelength dispersion based on a received waveform of the received signal that has passed through said electric dispersion compensator, said adaptive amount-of-compensation controller automatically controls an optimum compensation coefficient to be used by said electric dispersion compensator and the identification threshold value of said clock data recovery circuit.

22. An automatic dispersion compensating system comprising:
a receiver including a dispersion detecting apparatus according to claim 5; and
a transmitter for dispersion-equalizing an optical signal serving as a transmission signal based on the detected amount of polarization dispersion fed back from said dispersion detecting apparatus, and thereafter transmitting the optical signal.

23. An automatic dispersion compensating system comprising:
- a dispersion detecting apparatus according to claim 1;
- an optoelectric transducer circuit for converting a received signal transmitted through said transmission path from an optical signal into an electric signal;
- an electric dispersion compensator for compensating for a waveform degradation, caused by polarization dispersion, of the received signal as converted into the electric signal by said optoelectric transducer circuit;
- a clock data recovery circuit for reproducing and extracting a clock signal, and recovering a data signal, from the signal that has passed through said electric dispersion compensator;
- a demultiplexer for converting the data signal output from said clock data recovery circuit from a series signal into a parallel signal; and
- an adaptive amount-of-compensation controller for controlling a compensation coefficient of said electric dispersion compensator and an identification threshold value of said clock data recovery circuit based on the amount of polarization dispersion which is detected by said dispersion detecting apparatus;
- wherein after said dispersion detecting apparatus has detected said amount of polarization dispersion based on a received waveform of the received signal that has passed through said electric dispersion compensator, said adaptive amount-of-compensation controller automatically controls an optimum compensation coefficient to be used by said electric dispersion compensator and the identification threshold value of said clock data recovery circuit.

24. An automatic dispersion compensating system comprising:
- a receiver including a dispersion detecting apparatus according to claim 1; and
- a transmitter for dispersion-equalizing an optical signal serving as a transmission signal based on the detected amount of polarization dispersion fed back from said dispersion detecting apparatus, and thereafter transmitting the optical signal.

* * * * *